(12) United States Patent
Koki et al.

(10) Patent No.: US 12,418,320 B2
(45) Date of Patent: Sep. 16, 2025

(54) TABLET AND TABLET COVER WITH CONFIGURATION DETECTION

(71) Applicant: Intel Corporation, Santa Clara, CA (US)

(72) Inventors: Tarakesava Reddy Koki, Telengana (IN); Mallari Hanchate, Bangalore (IN); Aiswarya M. Pious, Bengaluru (IN); Vinay Kumar Chandrasekhara, Bangalore (IN); Antonio Shiu Kee Cheng, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 754 days.

(21) Appl. No.: 17/561,789

(22) Filed: Dec. 24, 2021

(65) Prior Publication Data

US 2022/0123776 A1    Apr. 21, 2022

(51) Int. Cl.
| | | |
|---|---|---|
| *H04B 1/00* | (2006.01) | |
| *G06F 3/02* | (2006.01) | |
| *G06F 3/041* | (2006.01) | |
| *H04B 1/3827* | (2015.01) | |
| *H04B 1/3888* | (2015.01) | |

(52) U.S. Cl.
CPC ......... *H04B 1/3838* (2013.01); *G06F 3/0227* (2013.01); *G06F 3/0416* (2013.01); *H04B 1/3888* (2013.01)

(58) Field of Classification Search
CPC ... H04B 1/3838; H04B 1/3888; G06F 3/0227; G06F 3/0416; G06F 2200/1633; G06F 1/1632; G06F 1/1669; G06F 3/038; G06F 3/0393
See application file for complete search history.

(56) References Cited

U.S. PATENT DOCUMENTS

| | | | |
|---|---|---|---|
| 9,916,031 B2 * | 3/2018 | Putzolu | G06F 3/023 |
| 9,965,022 B2 | 5/2018 | Schneider | |
| 9,983,637 B1 | 5/2018 | Morrison et al. | |
| 11,025,770 B2 * | 6/2021 | Kwon | G06F 1/1643 |
| 2009/0058429 A1 | 3/2009 | Harris et al. | |
| 2011/0210754 A1 | 9/2011 | Shen | |

(Continued)

OTHER PUBLICATIONS

PCT/US2022/051072 International Search Report and Written Opinion of the International Searching Authority dated Apr. 5, 2023 (11 pages).

(Continued)

*Primary Examiner* — Md K Talukder
(74) *Attorney, Agent, or Firm* — Banner & Witcoff Ltd.

(57) ABSTRACT

Particular embodiments described herein provide for a tablet computer that can be configured to include a display, an antenna, a plurality of capacitance-based proximity sensors, and a configuration engine. The configuration engine uses the capacitance-based proximity sensors to determine a configuration of the tablet computer when the tablet computer is attached to an accessory. The capacitance-based proximity sensors can be specific absorption rate (SAR) proximity sensors used to determine when to reduce radiation from one or more antenna when the tablet computer is not coupled to the accessory and to determine a configuration of the tablet computer when the tablet computer is coupled to an accessory.

16 Claims, 14 Drawing Sheets

(56) References Cited

U.S. PATENT DOCUMENTS

| | | | |
|---|---|---|---|
| 2012/0072167 A1* | 3/2012 | Cretella, Jr. | G06F 9/00 |
| | | | 702/150 |
| 2016/0077621 A1* | 3/2016 | Min | G06F 3/041 |
| | | | 345/173 |
| 2016/0149597 A1* | 5/2016 | Takasu | G06F 1/1698 |
| | | | 455/127.2 |
| 2016/0197637 A1* | 7/2016 | Lee | G06F 3/14 |
| | | | 455/566 |
| 2017/0054467 A1* | 2/2017 | Miyazawa | H04B 1/3888 |
| 2017/0250719 A1* | 8/2017 | Stryker | H04B 1/3888 |
| 2018/0241427 A1* | 8/2018 | Stryker | H04B 1/3877 |
| 2019/0064885 A1* | 2/2019 | Paik | G06F 1/1632 |
| 2020/0012271 A1* | 1/2020 | Jeon | G06F 9/48 |
| 2020/0298105 A1* | 9/2020 | Nasti | G06F 1/1654 |
| 2020/0363840 A1* | 11/2020 | Hurst | G06F 1/1677 |
| 2021/0408685 A1* | 12/2021 | Chang | H01Q 5/371 |
| 2022/0123776 A1 | 4/2022 | Koki et al. | |
| 2022/0413547 A1* | 12/2022 | Sung | G06F 1/1681 |

OTHER PUBLICATIONS

Semtech Corporation, "SX9300 Ultra Low Power, Dual Channel Smart Proximity SAR Compliant Solution," Datasheet, Revision 4, Feb. 5, 2014; 39 pages.

\* cited by examiner

TABLET AND TABLET COVER WITH CONFIGURATION DETECTION

TECHNICAL FIELD

This disclosure relates in general to the field of computing, and more particularly, to a tablet and accessory with configuration detection.

BACKGROUND

End users have more electronic device choices than ever before. A number of prominent technological trends are currently afoot and these trends are changing the electronic device landscape. Some of the technological trends involve tablet computers. Generally, tablet computers are a wireless mobile device with a touchscreen display. The tablet computers are typically used with a cover or stand to support the tablet computer in different configurations.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

Figure 1A:
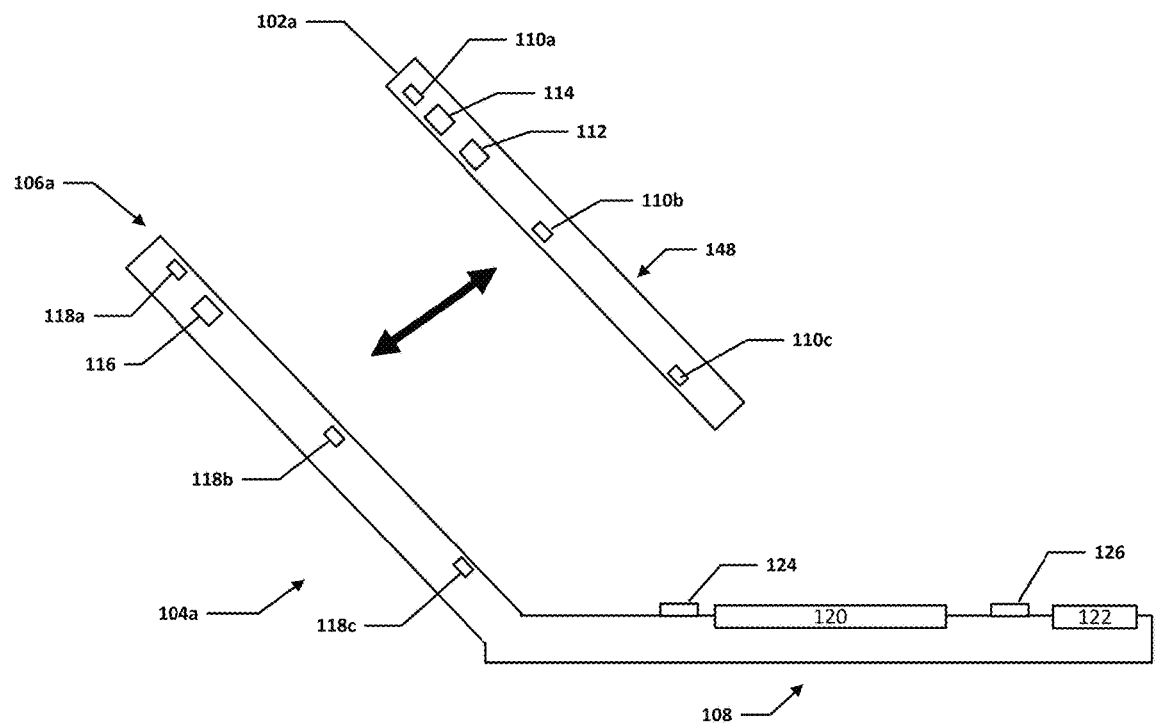
FIGS. 1A-1F are a simplified block diagrams of a system to enable a tablet and accessory with configuration detection, in accordance with an embodiment of the present disclosure.

The FIGURES of the drawings are not necessarily drawn to scale, as their dimensions can be varied considerably without departing from the scope of the present disclosure.

DETAILED DESCRIPTION

Example Embodiments

The following detailed description sets forth examples of devices, apparatuses, methods, and systems relating to a tablet and accessory with configuration detection. Features such as structure(s), function(s), and/or characteristic(s), for example, are described with reference to one embodiment as a matter of convenience; various embodiments may be implemented with any suitable one or more of the described features.

In an example, a tablet can include mode sensors and an accessory can include mode sensor triggers that, when the tablet is attached to the accessory, can trigger or activate the mode sensors. The tablet can also include a configuration engine that receives data related to whether or not a specific mode sensor in the tablet is triggered and based on the received data, determine the mode or configuration of the tablet and accessory. In some examples, the mode sensors are capacitance-based sensors. In a specific example, the mode sensors are specific absorption rate (SAR) proximity sensors. To meet regulatory requirements for antenna transmittance power, a SAR proximity sensor is required for every transmitting antenna. When the tablet is not coupled to the accessory, the SAR proximity sensors can be used to help to reduce the antenna transmitter power based on the proximity of the user relative to the tablet. When the tablet is coupled to the accessory, the SAR proximity sensors can be used to help determine a configuration of the tablet. When the tablet is not coupled to the accessory, the SAR proximity sensors are used to determine when to reduce radiation from one or more antenna. More specifically, the SAR sensor data has a dual purpose such that when the tablet is not coupled to the accessory, the SAR sensor data help to determine when to reduce radiation from one or more antenna located in the tablet and when the tablet is coupled to the accessory, the SAR sensor data can be used to help determine an operating mode and/or configuration of the tablet and accessory.

If the mode sensors are capacitance based mode sensors, the tablet can include capacitance triggers to induce a change in capacitance of the capacitance based sensors. When a capacitance based mode sensor is in close proximity of a capacitance trigger, the capacitance based modes sensor is triggered. In some examples, a mode sensor is triggered if the modes sensor is twenty-five (25) millimeters or less from the mode sensor trigger and ranges therein (e.g., 15 millimeters or less from the mode sensor trigger, 12 millimeter or less from the mode sensor trigger, 5 millimeters or less from the mode sensor trigger, etc.), depending on design choice and design constrains. If the mode sensor is more than twenty-five (25) millimeters from the mode sensor trigger and ranges therein, then the modes sensor is not triggered.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

The terms "over," "under," "below," "between," and "on" as used herein refer to a relative position of one layer or component with respect to other layers or components. For example, one layer disposed over or under another layer may be directly in contact with the other layer or may have one or more intervening layers. Moreover, one layer disposed between two layers may be directly in contact with the two layers or may have one or more intervening layers. In contrast, a first layer "directly on" a second layer is in direct contact with that second layer. Similarly, unless explicitly stated otherwise, one feature disposed between two features may be in direct contact with the adjacent features or may have one or more intervening layers.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example.

FIG. 1A is a simplified block diagram of a tablet 102a and an accessory 104a that are physically separate from each other. The tablet 102a can include mode sensors 110a-110c, a configuration engine 112, an accessory communication interface 114, and a display 148. The accessory 104a can include a first portion 106a and a second portion 108. The first portion 106a can be a foldable or bendable portion that can help provide support for the tablet 102a in different configurations. The second portion 108 can be a base portion that can be over a relatively flat surface such as a table top and provide a base and stability for the first portion 106a. In some examples, the configuration engine 112 can be located in the accessory 104a.

The first portion 106a of the accessory 104a can include mode sensor triggers 118a-118c and a tablet communication interface 116. The second portion 108 can include a first user input portion 120, a second user input portion 122, a first tablet stop 124, and a second tablet stop 126. The first user input portion 120 can be a keyboard and the second user input portion 122 can be a touchpad, gaming pad, music mixer, etc. The accessory communication interface 114 in the tablet 102a and the tablet communication interface 116 in the accessory 104a may be a wireless communication interface (e.g., Bluetooth, WiFi, etc.) or a hardwired communication interface (e.g., USB, pogo pin, etc.). As illustrated in FIG. 1A, the tablet 102a can be removably coupled to the first portion 106a of the accessory 104a. The tablet 102a can be attached to the accessory mechanically, magnetically, or through some other means.

Figure 1B:
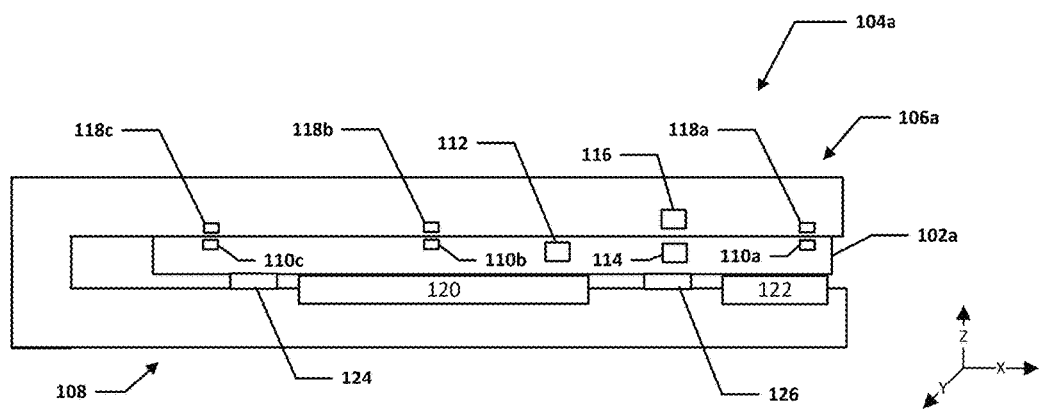

FIG. 1B is a simplified block diagram of the tablet 102a coupled to the accessory 104a in a closed configuration. The tablet 102a can include the mode sensors 110a-110c, the configuration engine 112, the accessory communication interface 114, and the display 148 (not referenced). The accessory 104a can include the first portion 106a and the second portion 108. The first portion 106a of the accessory 104a can include the mode sensor triggers 118a-118c and the tablet communication interface 116. The second portion 108 can include the first user input portion 120, the second user input portion 122, the first tablet stop 124, and the second tablet stop 126.

The mode sensor triggers 118a-118c can be used to trigger or activate the mode sensors 110a-110c. More specifically, the mode sensor trigger 118a can be used to trigger or activate the mode sensor 110a, the mode sensor trigger 118b can be used to trigger or activate the mode sensor 110b, and the mode sensor trigger 118c can be used to trigger or activate the mode sensor 110c. If the mode sensors 110a-110c are capacitance based mode sensors, the mode sensor triggers 118a-118c can induce a change in capacitance of the mode sensors 110a-110c. When a specific mode sensor is in close proximity of a specific mode sensor trigger, the specific mode sensor is triggered. In some examples, a specific mode sensor is triggered if the specific mode sensor is twenty-five (25) millimeters or less from the specific mode sensor trigger and ranges therein (e.g., 15 millimeters or less from the specific mode sensor trigger, 12 millimeter or less from the specific mode sensor trigger, 5 millimeters or less from the specific mode sensor trigger, etc.), depending on design choice and design constrains. If the specific mode sensor is more than twenty-five (25) millimeters from the specific mode sensor trigger and ranges therein, then the specific modes sensor is not triggered.

The mode sensors 110a-110c can communicate with the configuration engine 112 to help determine the mode or configuration of the tablet 102a and the accessory 104a. The accessory communication interface 114 in the tablet 102a can communicate with the tablet communication interface 116 in the accessory 104a to activate or deactivate the first user input portion 120 and to activate or deactivate the second user input portion 122, depending on the determined mode or configuration of the tablet 102a. In some examples, the tablet communication interface 116 activates and deactivates the first user input portion 120 and/or the second user input portion 122. In other examples, the table communication interface 116 sends a signal to the first user input portion 120 and/or the second user input portion 122 to cause the first user input portion and/or the second user input portion 122 to self-activate or self-deactivate. In yet other examples, to deactivate the first user input portion 120 and/or the second user input portion 122, the accessory communication interface 114 blocks or does not register signals from the first user input portion 120 and/or the second user input portion 122. In yet other examples, to deactivate the first user input portion 120 and/or the second user input portion 122, logic (e.g., a processor) in the tablet 102a blocks signals from the first user input portion 120 and/or the second user input portion 122.

As illustrated in FIG. 1B, the tablet 102a is coupled to the accessory 104a in the closed configuration and the mode sensor 110a is triggered or activated by the mode sensor trigger 118a, the mode sensor 110b is triggered or activated by the mode sensor trigger 118b, and the mode sensor 110c is triggered or activated by the mode sensor trigger 118c. Each of the mode sensors 110a-110c can communicate with the configuration engine 112 that they were triggered or activated to help determine that the mode or configuration of the tablet 102a and the accessory 104a is in the closed configuration. The accessory communication interface 114 in the tablet 102a can communicate with the tablet communication interface 116 in the accessory 104a to deactivate the first user input portion 120 and the second user input portion 122 in the closed configuration to save power and help prevent accidental input (e.g., an accidental keypress if the first user input portion 120 is a keyboard). The accessory communication interface 114 in the tablet 102a and the tablet communication interface 116 in the accessory 104a may be a wireless communication interface (e.g., Bluetooth, WiFi, etc.) or a hardwired communication interface (e.g., USB, pogo pin, etc.).

Figure 1C:
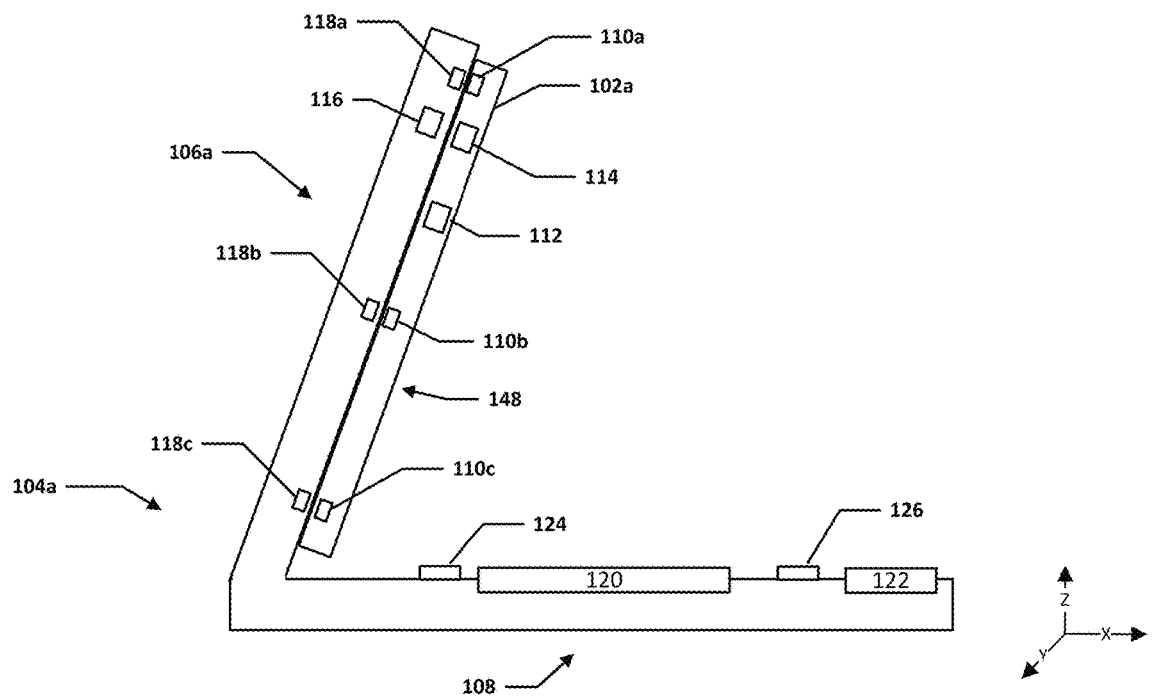

Turning to FIG. 1C, FIG. 1C is a simplified block diagram of the tablet 102a coupled to the accessory 104a in a transitioning to open configuration. The tablet 102a can include the mode sensors 110a-110c, the configuration engine 112, the accessory communication interface 114, and the display 148. The accessory 104a can include the first portion 106a and the second portion 108. The first portion 106a of the accessory 104a can include the mode sensor triggers 118a-118c and the tablet communication interface 116. The second portion 108 can include the first user input portion 120, the second user input portion 122, the first tablet stop 124, and the second tablet stop 126.

The mode sensor triggers 118a-118c can be used to trigger or activate the mode sensors 110a-110c. More specifically, the mode sensor trigger 118a can be used to trigger or activate the mode sensor 110a, the mode sensor trigger 118b can be used to trigger or activate the mode sensor 110b, and the mode sensor trigger 118c can be used to trigger or activate the mode sensor 110c. The mode sensors 110a-110c can communicate with the configuration engine 112 to help determine the mode or configuration of the tablet 102a and the accessory 104a. The accessory communication interface 114 in the tablet 102a can communicate with the tablet communication interface 116 in the accessory 104a to activate or deactivate the first user input portion 120 and to activate or deactivate the second user input portion 122, depending on the determined mode or configuration of the tablet 102a.

As illustrated in FIG. 1C, the tablet 102a is coupled to the accessory 104a in the transitioning to open configuration and a user would not be using the first user input portion 120 or the second user input portion 122. Similar to the closed configuration, in the transitioning to open configuration, the mode sensor 110a is triggered or activated by the mode sensor trigger 118a, the mode sensor 110b is triggered or activated by the mode sensor trigger 118b, and the mode sensor 110c is triggered or activated by the mode sensor trigger 118c. Each of the mode sensors 110a-110c can communicate with the configuration engine 112 that they were triggered or activated to help determine that the mode or configuration of the tablet 102a and the accessory 104a is the transitioning to open configuration. The accessory communication interface 114 in the tablet 102a can communicate with the tablet communication interface 116 in the accessory 104a to deactivate the first user input portion 120 and the second user input portion 122 in the transitioning to open configuration to save power and help prevent accidental input (e.g., an accidental keypress if the first user input portion 120 is a keyboard).

Figure 1D:
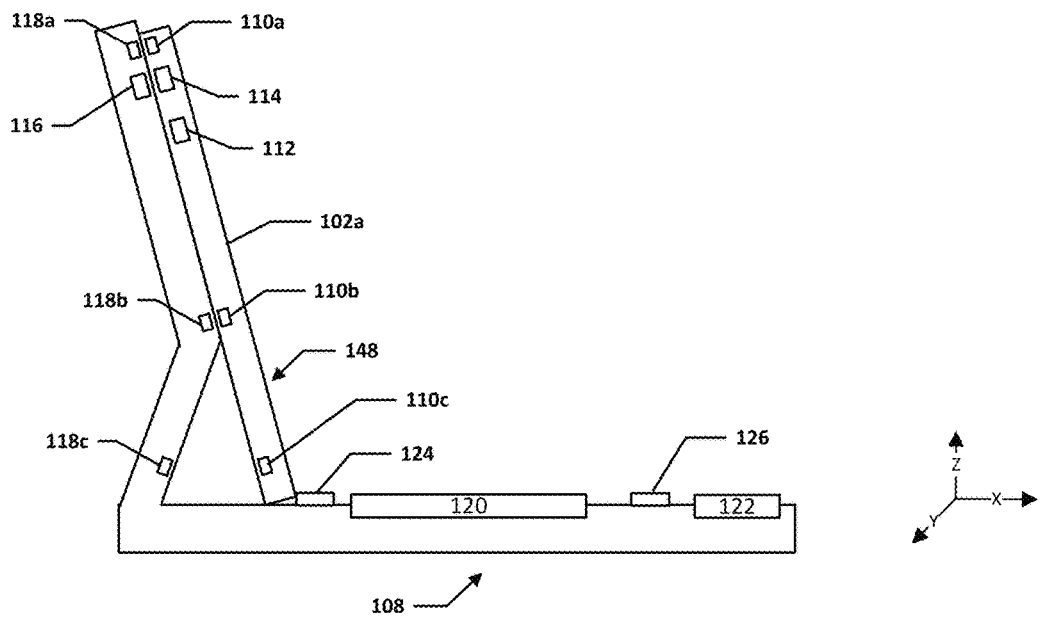

Turning to FIG. 1D, FIG. 1D is a simplified block diagram of the tablet 102a coupled to the accessory 104a in a clamshell mode configuration. The tablet 102a can the include the mode sensors 110a-110c, the configuration engine 112, the accessory communication interface 114, and the display 148. The accessory 104a can include the first portion 106a and the second portion 108. The first portion 106a of the accessory 104a can include the mode sensor triggers 118a-118c and the tablet communication interface 116. The second portion 108 can include the first user input portion 120, the second user input portion 122, the first tablet stop 124, and the second tablet stop 126.

The mode sensor triggers 118a-118c can be used to trigger or activate the mode sensors 110a-110c. More specifically, the mode sensor trigger 118a can be used to trigger or activate the mode sensor 110a, the mode sensor trigger 118b can be used to trigger or activate the mode sensor 110b, and the mode sensor trigger 118c can be used to trigger or activate the mode sensor 110c. The mode sensors 110a-110c can communicate with the configuration engine 112 to help determine the mode or configuration of the tablet 102a and the accessory 104a. The accessory communication interface 114 in the tablet 102a can communicate with the tablet communication interface 116 in the accessory 104a to activate or deactivate the first user input portion 120 and to activate or deactivate the second user input portion 122, depending on the determined mode or configuration of the tablet 102a.

As illustrated in FIG. 1D, the tablet 102a is coupled to the accessory 104a in the clamshell mode configuration and the user (not shown) is using the tablet 102a similar to a laptop computer. More specifically, the tablet 102a has been tilted and is supported by the first tablet stop 124. In the clamshell mode configuration, the user can interact with the first user input portion 120 and the second user input portion 122. In the clamshell mode configuration, the mode sensor 110a is triggered or activated by the mode sensor trigger 118a, the mode sensor 110b is triggered or activated by the mode sensor trigger 118b, and the mode sensor 110c is not triggered or activated by the mode sensor trigger 118c. The mode sensors 110a and 110b can communicate with the configuration engine 112 that they are triggered or activated and the mode sensor 110c can communicate with the configuration engine 112 that it is not triggered to help determine that the mode or configuration of the tablet 102a and the accessory 104a is the clamshell mode configuration. The accessory communication interface 114 in the tablet 102a can communicate with the tablet communication interface 116 in the accessory 104a to activate the first user input portion 120 and the second user input portion 122 in the clamshell mode configuration to allow the user to use the first user input portion 120 and the second user input portion 122.

Figure 1E:
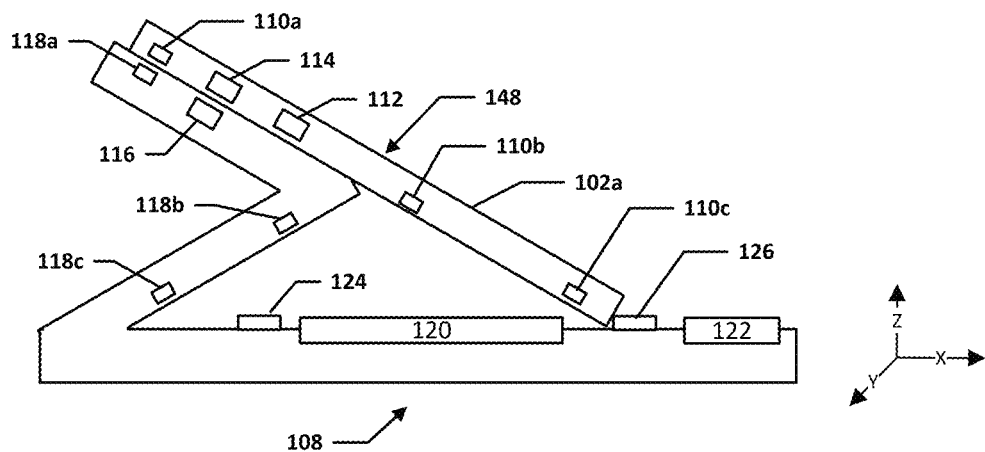

Turning to FIG. 1E, FIG. 1E is a simplified block diagram of the tablet 102a coupled to the accessory 104a in a media mode configuration. The tablet 102a can include the mode sensors 110a-110c, the configuration engine 112, the accessory communication interface 114, and the display 148. The accessory 104a can include the first portion 106a and the second portion 108. The first portion 106a of the accessory 104a can include the mode sensor triggers 118a-118c and the tablet communication interface 116. The second portion 108 can include the first user input portion 120, the second user input portion 122, the first tablet stop 124, and the second tablet stop 126.

The mode sensor triggers 118a-118c can be used to trigger or activate the mode sensors 110a-110c. More specifically, the mode sensor trigger 118a can be used to trigger or activate the mode sensor 110a, the mode sensor trigger 118b can be used to trigger or activate the mode sensor 110b, and the mode sensor trigger 118c can be used to trigger or activate the mode sensor 110c. The mode sensors 110a-110c can communicate with the configuration engine 112 to help determine the mode or configuration of the tablet 102a and the accessory 104a. The accessory communication interface 114 in the tablet 102a can communicate with the tablet communication interface 116 in the accessory 104a to activate or deactivate the first user input portion 120 and to activate or deactivate the second user input portion 122.

As illustrated in FIG. 1E, the tablet 102a is coupled to the accessory 104a in the media mode configuration and the user (not shown) is using the tablet 102a primary for viewing the display 148 (e.g., the user is watching a video or movie displayed on the display 148). More specifically, the tablet 102a has been tilted and is supported by the second tablet stop 126. In the media mode configuration, the user cannot or should not interact with the first user input portion 120 as the first user input portion 120 is blocked by the tablet 102a but the user can interact with the second user input portion 122. In the media mode configuration, the mode sensor 110a is triggered or activated by the mode sensor trigger 118a, the mode sensor 110b is not triggered or activated by the mode sensor trigger 118b, and the mode sensor 110c is not triggered or activated by the mode sensor trigger 118c. The mode sensor 110a can communicate with the configuration engine 112 that it is triggered or activated and the mode sensors 110b and 110c can communicate with the configuration engine 112 that they are not triggered to help determine that the mode or configuration of the tablet 102a and the accessory 104a is in the media mode configuration. The accessory communication interface 114 in the tablet 102a can communicate with the tablet communication interface 116 in the accessory 104a to deactivate the first user input portion 120 to save power and help prevent accidental usage of the first user input portion 120 (e.g., an accidental keypress if the first user input portion 120 is a keyboard) and to activate the second user input portion 122 in the media mode configuration to allow the user to use the second user input portion 122 (e.g., to pause or play a video being displayed on the display 148 of the tablet 102a if the second user input portion 122 is a touchpad).

Figure 1F:
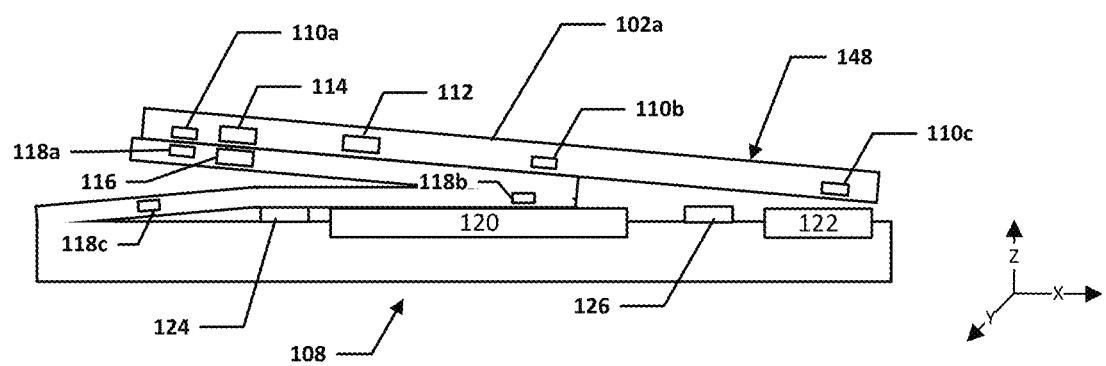

Turning to FIG. 1F, FIG. 1F is a simplified block diagram of the tablet 102a coupled to the accessory 104a in a tablet mode configuration. The tablet 102a can include the mode sensors 110a-110c, the configuration engine 112, the accessory communication interface 114, and the display 148. The accessory 104a can include the first portion 106a and the second portion 108. The first portion 106a of the accessory 104a can include the mode sensor triggers 118a-118c and the tablet communication interface 116. The second portion 108 can include the first user input portion 120, the second user input portion 122, the first tablet stop 124, and the second tablet stop 126.

The mode sensor triggers 118a-118c can be used to trigger or activate the mode sensors 110a-110c. More specifically, the mode sensor trigger 118a can be used to trigger or activate the mode sensor 110a, the mode sensor trigger 118b can be used to trigger or activate the mode sensor 110b, and the mode sensor trigger 118c can be used to trigger or activate the mode sensor 110c. The mode sensors 110a-110c can communicate with the configuration engine 112 to help determine the mode or configuration of the tablet 102a and the accessory 104a. The accessory communication interface 114 in the tablet 102a can communicate with the tablet communication interface 116 in the accessory 104a to activate or deactivate the first user input portion 120 and to activate or deactivate the second user input portion 122.

As illustrated in FIG. 1F, the tablet 102a is coupled to the accessory 104a in the tablet mode configuration and the user (not shown) is using the tablet 102a and not the first user input portion 120 nor the second user input portion 122. In the tablet mode configuration, the user cannot or should not interact with the first user input portion 120 and the second user input portion 122 as the first user input portion 120 and the second user input portion 122 are blocked by the tablet 102a. In the tablet mode configuration, the mode sensor 110a is triggered or activated by the mode sensor trigger 118a, the mode sensor 110b is semi-triggered or semi-activated by the mode sensor trigger 118b, and the mode sensor 110c is not triggered or activated by the mode sensor trigger 118c. For example, if the mode sensor 110b is a proximity sensor, then because the mode sensor trigger 118b is further away from the mode sensor 110b as compared to when the mode sensor 110b was triggered by the mode sensor trigger 118b in the clamshell mode illustrated in FIG. 1C, the mode sensor 110b is semi-triggered or semi-activated by the mode sensor trigger 118b. More specifically, if the mode sensor 110b is a capacity-based proximity sensor, the mode sensor trigger 118b will trigger a relatively weak capacitance or a capacitance below a predetermined threshold and cause the mode sensor 110b to be semi-triggered or semi-activated by the mode sensor trigger 118b.

The mode sensor 110a can communicate with the configuration engine 112 that it is triggered or activated, the mode sensor 110b can communicate with the configuration engine 112 that it is semi-triggered or semi-activated, and the mode sensor 110c can communicate with the configuration engine 112 that it is not triggered to help determine that the mode or configuration of the tablet 102a and the accessory 104a is the tablet mode configuration. The accessory communication interface 114 in the tablet 102a can communicate with the tablet communication interface 116 in the accessory 104a to deactivate the first user input portion 120 and the second user input portion 122 to save power and help prevent accidental input (e.g., an accidental keypress if the first user input portion 120 is a keyboard).

The tablet 102a can be a portable electronic, notebook tablet, tablet computer, notebook computer, digital art board, digital graphic tablet, sealed display, etc. The tablet 102a can include one or more processors, memory, and electronics. Each of the electronics can be a device or group of devices available to assist in the operation or function of the tablet 102a. The accessory 104a can also include one or more processors, memory, and electronics. Each of the electronics can be a device or group of devices available to assist in the operation or function of the accessory 104a. The accessory 104a can be powered by an onboard battery, by the tablet 102a (e.g., using the tablet communication interface 116 or some other power connection), an alternating current (AC) power source, a wall socket, or some other power source (e.g., an external battery, etc.). Each of the mode sensors 110a-110c can be a proximity sensor and more particularly a capacitance-based proximity sensor. The display 148 can be a touchscreen display or any other suitable display screen system.

It is to be understood that other embodiments may be utilized and structural changes may be made without departing from the scope of the present disclosure. Substantial flexibility is provided by the tablet 102a and accessory 104a in that any suitable arrangements and configuration may be provided without departing from the teachings of the present disclosure.

For purposes of illustrating certain example techniques of the tablet 102a and accessory 104a, the following foundational information may be viewed as a basis from which the present disclosure may be properly explained. Generally, a tablet computer (commonly referred to as a tablet) is a wireless mobile device, typically with a mobile operating system, touchscreen display processing circuitry, and a rechargeable battery in a single, thin and flat package. The tablet form factor is typically smaller than a notebook computer but larger than a smartphone. Early tablet computers used either a keyboard or a stylus to input information, but the keyboard and stylus were subsequently replaced by touch screens.

Today, tablets function similar to personal computers but typically lack some of the input/output (I/O) abilities of personal computers. For example, most current tablets do not have physical keyboards and usually accept text and other input by use of a virtual keyboard shown on their touchscreen displays. To compensate for the lack of a physical keyboard, tablets can connect to independent physical external keyboards using a wireless connection or a wired connection. The external keyboard is used to input text, characters, and other commands into tablet. The external keyboards are available for most tablets and some also function as a protective accessory for the tablet. The protective accessory can function as a support to support the tablet in different user modes. However, it can sometimes be a problem for the tablet to be configured to the correct user mode.

A tablet and accessory, as outlined in FIG. 1, can resolve these issues (and others). In an example, the tablet can include mode sensors and the accessory can include mode sensor triggers that can trigger or activate the mode sensors. The tablet can also include a configuration engine that receives data related to whether or not a specific mode sensor in the tablet is triggered and based on the received data, determine the mode or configuration of the tablet and accessory. In some examples, the mode sensors are capacitance-based sensors. In a specific example, the mode sensors are specific absorption rate (SAR) proximity sensors. When the tablet is not coupled with the accessory, the SAR sensors are used to determine when to reduce radiation from one or more antenna. When the tablet is coupled to the cover, the SAR sensors can be used to detect the mode or configuration of the tablet and accessory based on the proximity of a portion of the accessory to a corresponding portion of the tablet.

Typically, tablets are wireless devices that include antennas placed on either side of the tablet to ensure minimal impact for a seamless industrial design. The tablets emit radiofrequency (RF) waves, a type of non-ionizing electromagnetic radiation (commonly called "cell phone radiation"). When a user holds or carries a mobile device such as a tablet close to the user's head and body, the user's head and body can absorb over half of the transmitted RF energy. The SAR is a measure of the rate of RF energy from a source absorbed by a user. A tablet's SAR rating is used to estimate the maximum rate of RF energy absorption by a user's head and body when using the device. In the United States, the Federal Communications Commission (FCC) sets regulatory requirements for antenna transmittance power and the tablet's exposure limit for the general public. A tablet's SAR rating must not exceed the FCC regulatory requirements for antenna transmittance power set by the FCC in order to receive FCC certification and be sold in the United States. To meet FCC regulatory requirements for antenna transmittance power, a SAR proximity sensor is required for every transmitting antenna. The SAR proximity sensor can help to reduce the antenna transmitter power based on the proximity of the user relative to the tablet. The SAR proximity sensor is a capacitance-based proximity sensor and is used to help determine the proximity of the user to the tablet. In a specific example of three SAR sensors located in the tablet (e.g., SAR1, SAR2, and SAR3), once the tablet is attached to an accessory that includes a keyboard and a touchpad, the system can use the SAR sensor data to determine the mode and configuration of the tablet. More specifically, the SAR sensor data can be used to measure an induced capacitance and threshold voltages and the measured induced capacitance, output as a voltage reading, can be compared to threshold voltages used to determine the configuration of the tablet and accessory. For example, the induced capacitance created by the accessory in each SAR senor for different configurations of the tablet can be set as the SAR threshold for each configuration of the tablet. The configuration of the tablet and accessory can be used to determine the mode of the tablet and how the user is using the tablet. Based on the mode of the tablet and how the user is using the tablet, the keyboard and/or touchpad can be enabled or disabled to help conserve power and to help prevent accidental inputs from the user.

For example, in a clamshell mode configuration, the accessory is attached to the entire tablet. In the clamshell mode configuration, the induced capacitance on SAR1, SAR2, SAR3 reach a threshold voltage Vth2. Once connected, a SAR controller interrupts the host device. A configuration engine (e.g., the configuration engine 112) can read the induced capacitance offered by each of the SAR elements. The configuration engine uses the induced capacitance information and detects the device mode is in a clamshell mode configuration. The device mode information (clamshell mode configuration detection) is passed to the accessory to enable both keyboard and touchpad functionality.

In a media mode configuration (pull forward mode) the tablet is pulled forward over the keyboard portion of the accessory. The media mode configuration is mainly intended for video consumption or extended hours of browsing. In the media mode configuration, SAR1, SAR2 induced capacitance reaches the threshold voltage Vth2. Once connected, a SAR controller interrupts the host device as the accessory covers both SAR2 and SAR3. The induced capacitance on SAR3 remains less than a threshold voltage Vth3 and will not be triggered as the accessory is not close to SAR3. The configuration engine uses the induced capacitance information and detects the tablet is in a media mode configuration. The device mode information (media mode configuration detection) is passed to the accessory to disable the keyboard but not the touchpad. The reason for disabling the keyboard is to save power and avoid unintentional keyclicks. The touchpad is enabled to allow the user to interact with the tablet, especially during playback of a video or movie (e.g., to pause, rewind, fast forward, etc. the video or movie.).

In a tablet mode configuration with the tablet coupled to the accessory, the tablet is over the keyboard portion and the touchpad portion of the accessory. In the tablet mode configuration SAR1, SAR2 are triggered with an induced capacitance of the threshold voltage Vth2. The SAR3 also triggered with an induced capacitance of the threshold voltage Vth3 indicating that the accessory is away from the SAR3 sensor in the tablet by about ten (10) to about fifteen (15) mm. The configuration engine uses the induced capacitance information and detects the tablet is in a tablet mode configuration. The device mode information (tablet mode configuration detection) is passed to the accessory to disable the keyboard and the touchpad. The reason for disabling the keyboard and the touchpad is to save power and avoid unintentional keyclicks or cursor movements. Variation in the mutual or self-capacitance from the accessory for the SAR3 sensor is dependent on the distance between the accessory to the SAR3 sensor. The SAR3 sensor can accurately determine a distance between the tablet and the accessory based on the voltage change on the input channel of the SAR3.

The configuration engine identifies connectivity between the accessory communication interface in the tablet and the tablet communication interface in the accessory to determine if the accessory is attached. For example, an accessory communication interface (e.g., the accessory communication interface 114) in the tablet can communicate with a tablet communication interface (e.g., the tablet communication interface 116) in the accessory and communicate a signal to the configuration engine when a connection is established. In another example, the configuration engine can read the SAR sensors and determine if they are triggered to determine if the accessory is attached.

When the configuration engine determines that the tablet is connected to the accessory, the interrupt status for SAR1, SAR2, and SAR3 is determined. If the SAR1, SAR2, and SAR3 interrupts are triggered, the configuration engine compares the readings from SAR1, SAR2, and SAR3 and compares the readings to the voltage thresholds Vth1, Vth2, and Vth3 to determine the configuration of the tablet and accessory. If Vth2≤SAR1,2,3<Vth1, the configuration engine identifies the tablet and accessory are in the laptop mode and enables the keyboard and the touchpad. If Vth3≤SAR,3≤Vth2 and Vth2≤SAR1,2<Vth1, the configuration engine identifies the tablet and accessory are in the tablet mode and disables the keyboard and the touchpad. If not, the configuration engine determines if the SAR1 interrupt and the SAR2 interrupt are triggered and the SAR3 interrupt is not triggered, followed by the threshold Vth2 SAR1,2<Vth1, the configuration engine determines the tablet and accessory is in the media mode. If the tablet and accessory are in the media mode configuration, the configuration engine disables the keyboard and enables the touch pad. The current system can disable the keyboard and the touchpad separately based on device modes.

The system can calibrate the induced capacitance offered by the accessory in different modes and set the SAR threshold for each mode. The mode detection will activate only when the accessory is attached to the tablet. If the tablet is not coupled to the accessory, then the SAR thresholds are set for normal use of antenna detuning. The SAR sensors can detect human presence and accessory presence. The basic principle of operation for the SAR sensor is based on self-capacitance or mutual capacitance and the SAR sensor can determine a distance from an object based on the mutual capacitance change due to change in the distance between the object (accessory) to the SAR sensor. The SAR sensor allows different calibration settings (e.g., one with keyboard and one without keyboard) dynamically to set the capacitance threshold.

As compared to inferred sensors, capacitive sensing uses a lower power consumption, an aperture is not essential, and capacitive sensing is not sensitive to ambient light conditions. Additionally, a relatively small real estate is required for a capacitive sensor as compared to inferred sensors. Capacitive sensing can be done between a single electrode and the circuit common ground using self-capacitance, or between two electrodes using mutual capacitance. Each method has its advantages, but because of the largely variable parasitic capacitance between the circuit common ground and earth in mobile devices, mutual capacitance techniques are preferred. The sensitivity of capacitive sensors is highly adjustable and allows for a large variety of electrode sizes and overlay materials. Conductive overlays have a degrading effect on the operation of the capacitive sensors and may cause loss of sensitivity or even unstable operation. As with RF antennas, capacitor sensors should not be covered with a conductive overlay. Detection of the accessory by a capacitive sensor is possibly by pre-fitting the accessory with a metal strip or some other device that will trigger the capacitive sensor (e.g., the mode sensor trigger 118a). This would enable an automatic variable calibration for accurate sensing.

The tablet 102a and the accessory 104a can include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. The tablet 102a may include virtual elements.

In regards to the internal structure associated with the tablet 102a and the accessory 104a, the tablet 102a and the accessory 104a can include memory elements for storing information to be used in the operations outlined herein. The tablet 102a and the accessory 104a may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in the tablet 102a and the accessory 104a could be provided in any database, register, queue, tablet, cache, control list, or other storage structure, all of which can be referenced at any suitable timeframe. Any such storage options may also be included within the broad term 'memory element' as used herein.

In certain example implementations, functions may be implemented by logic encoded in one or more tangible media (e.g., embedded logic provided in an ASIC, digital signal processor (DSP) instructions, software (potentially inclusive of object code and source code) to be executed by a processor, or other similar device, etc.), which may be inclusive of non-transitory computer-readable media. In some of these instances, memory elements can store data used for the operations. This includes the memory elements being able to store software, logic, code, or processor instructions that are executed to carry out activities.

In an example implementation, elements of the tablet 102a and the accessory 104a may include software modules to achieve, or to foster, operations. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve operations.

Additionally, the tablet 102a and the accessory 104a may include one or more processors that can execute software or an algorithm to perform activities discussed herein. A processor can execute any type of instructions associated with the data to achieve the operations discussed herein. In one example, the processors could transform an element or an article (e.g., data) from one state or thing to another state or thing. In another example, the activities may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Figure 2A:
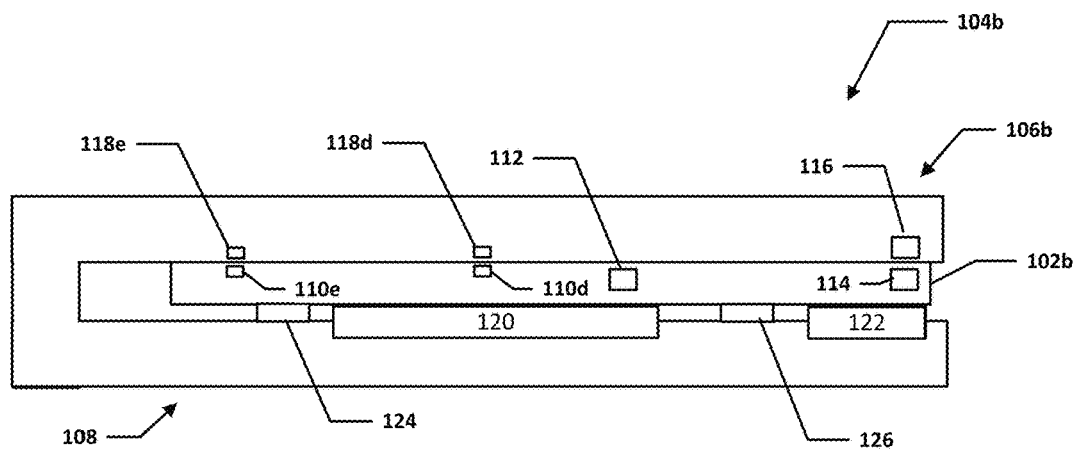
FIGS. 2A-2E are a simplified block diagrams of a system to enable a tablet and accessory with configuration detection, in accordance with an embodiment of the present disclosure.

Turning to FIG. 2A, FIG. 2A is a simplified block diagram of a tablet 102b coupled to an accessory 104b in a closed configuration. The tablet 102b can include mode sensors 110d and 110e, the configuration engine 112, and the accessory communication interface 114. The accessory 104b can include a first portion 106b and the second portion 108. The first portion 106b of the accessory 104b can include mode sensor triggers 118d and 118e and the tablet communication interface 116. The second portion 108 can include the first user input portion 120, the second user input portion 122, the first tablet stop 124, and the second tablet stop 126. The first user input portion 120 can be a keyboard and the second user input portion 122 can be a touchpad.

The mode sensor triggers 118d and 118e can be used to trigger or activate the mode sensors 110d and 110e. More specifically, the mode sensor trigger 118d can be used to trigger or activate the mode sensor 110d and the mode sensor trigger 118e can be used to trigger or activate the mode sensor 110e. The mode sensors 110d and 110e can communicate with the configuration engine 112 to help determine the mode or configuration of the tablet 102b and the accessory 104b. The accessory communication interface 114 in the tablet 102b can communicate with the tablet communication interface 116 in the accessory 104b to activate or deactivate the first user input portion 120 and to activate or deactivate the second user input portion 122.

As illustrated in FIG. 2A, the tablet 102b is coupled to the accessory 104b in the closed configuration and the mode sensor 110d is triggered or activated by the mode sensor trigger 118d and the mode sensor 110e is triggered or activated by the mode sensor trigger 118e. Each of the mode sensors 110d and 110e can communicate with the configuration engine 112 that they were triggered or activated to help determine that the mode or configuration of the tablet 102b and the accessory 104b is in the closed configuration. The accessory communication interface 114 in the tablet 102b can communicate with the tablet communication interface 116 in the accessory 104b to deactivate the first user input portion 120 and the second user input portion 122 in the closed configuration to save power and help prevent accidental input (e.g., an accidental keypress if the first user input portion 120 is a keyboard).

Figure 2B:
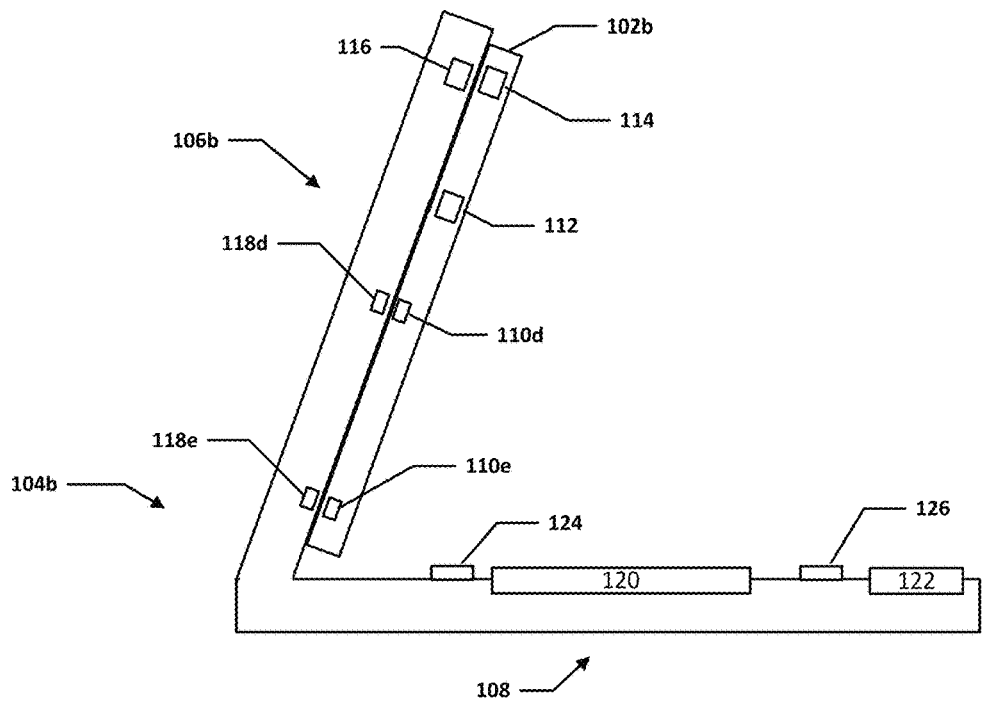

Turning to FIG. 2B, FIG. 2B is a simplified block diagram of the tablet 102b coupled to the accessory 104b in a transitioning to open configuration. The tablet 102b can include the mode sensors 110d and 110e, the configuration engine 112, and the accessory communication interface 114. The accessory 104b can include the first portion 106b and the second portion 108. The first portion 106b of the accessory 104b can include the mode sensor triggers 118d and 118e and the tablet communication interface 116. The second portion 108 can include the first user input portion 120, the second user input portion 122, the first tablet stop 124, and the second tablet stop 126.

The mode sensor triggers 118d and 118e can be used to trigger or activate the mode sensors 110d and 110e. More specifically, the mode sensor trigger 118d can be used to trigger or activate the mode sensor 110d and the mode sensor trigger 118e can be used to trigger or activate the mode sensor 110e. The mode sensors 110d and 110e can communicate with the configuration engine 112 to help determine the mode or configuration of the tablet 102b and the accessory 104b. The accessory communication interface 114 in the tablet 102b can communicate with the tablet communication interface 116 in the accessory 104b to activate or deactivate the first user input portion 120 and to activate or deactivate the second user input portion 122.

As illustrated in FIG. 2B, the tablet 102b is coupled to the accessory 104b in the transitioning to open configuration and a user would not be using the first user input portion 120 or the second user input portion 122. Similar to the closed configuration, in the transitioning to open configuration, the mode sensor 110d is triggered or activated by the mode sensor trigger 118d and the mode sensor 110e is triggered or activated by the mode sensor trigger 118e. Each of the mode sensors 110d and 110e can communicate with the configuration engine 112 that they were triggered or activated to help determine that the mode or configuration of the tablet 102b and the accessory 104b is the transitioning to open configuration. The accessory communication interface 114 in the tablet 102b can communicate with the tablet communication interface 116 in the accessory 104b to deactivate the first user input portion 120 and the second user input portion 122 in the transitioning to open configuration to save power and help prevent accidental input (e.g., an accidental keypress if the first user input portion 120 is a keyboard).

Figure 2C:
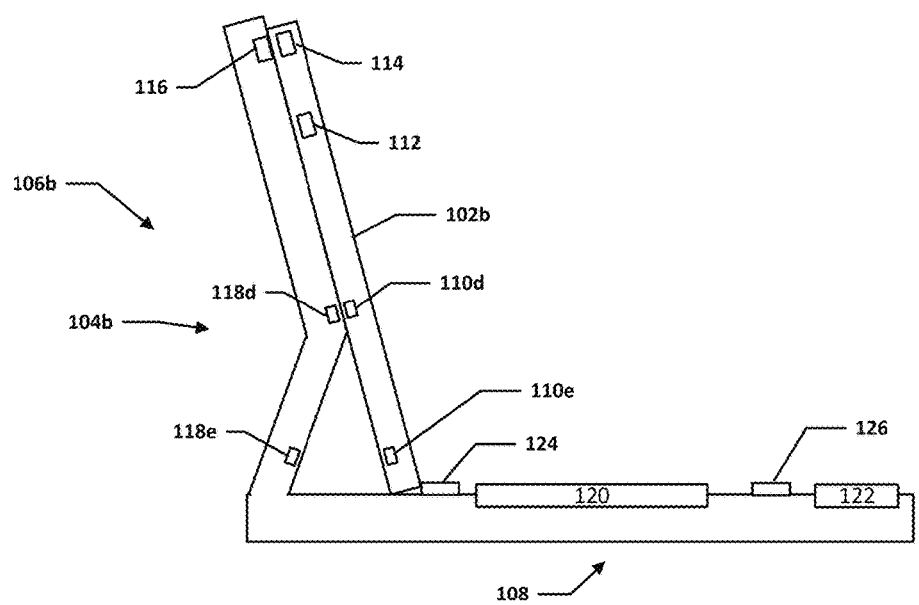

Turning to FIG. 2C, FIG. 2C is a simplified block diagram of the tablet 102b coupled to the accessory 104b in a clamshell mode configuration. The tablet 102b can include the mode sensors 110d and 110e, the configuration engine 112, and the accessory communication interface 114. The accessory 104b can include the first portion 106b and the second portion 108. The first portion 106b of the accessory 104b can include the mode sensor triggers 118d and 118e and the tablet communication interface 116. The second portion 108 can include the first user input portion 120, the second user input portion 122, the first tablet stop 124, and the second tablet stop 126.

The mode sensor triggers 118d and 118e can be used to trigger or activate the mode sensors 110d and 110e. More specifically, the mode sensor trigger 118d can be used to trigger or activate the mode sensor 110d and the mode sensor trigger 118e can be used to trigger or activate the mode sensor 110e. The mode sensors 110d and 110e can communicate with the configuration engine 112 to help determine the mode or configuration of the tablet 102b and the accessory 104b. The accessory communication interface 114 in the tablet 102b can communicate with the tablet communication interface 116 in the accessory 104b to activate or deactivate the first user input portion 120 and to activate or deactivate the second user input portion 122.

As illustrated in FIG. 2C, the tablet 102b is coupled to the accessory 104b in the clamshell mode configuration and the user (not shown) is using the tablet 102b similar to a laptop computer. More specifically, the tablet 102b has been tilted and is supported by the first tablet stop 124. In the clamshell mode configuration, the user can interact with the first user input portion 120 and the second user input portion 122. In the clamshell mode configuration, the mode sensor 110d is triggered or activated by the mode sensor trigger 118d and the mode sensor 110e is not triggered or activated by the mode sensor trigger 118e. The mode sensor 110d can communicate with the configuration engine 112 that it is triggered or activated and the mode sensor 110e can communicate with the configuration engine 112 that it is not triggered to help determine that the mode or configuration of the tablet 102b and the accessory 104b is the clamshell mode configuration. The accessory communication interface 114 in the tablet 102b can communicate with the tablet communication interface 116 in the accessory 104b to activate the first user input portion 120 and the second user input portion 122 in the clamshell mode configuration to allow the user to use the first user input portion 120 and the second user input portion 122.

Figure 2D:
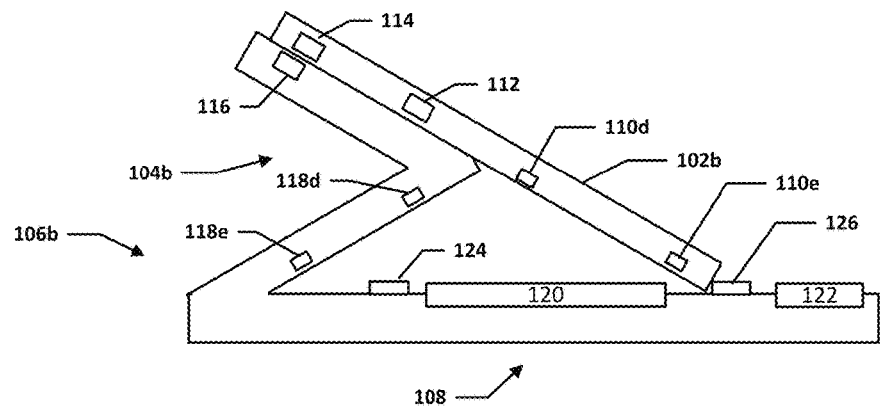

Turning to FIG. 2D, FIG. 2D is a simplified block diagram of the tablet 102b coupled to the accessory 104b in a media mode configuration. The tablet 102b can include the mode sensors 110d and 110e, the configuration engine 112, and the accessory communication interface 114. The accessory 104b can include the first portion 106b and the second portion 108. The first portion 106b of the accessory 104b can include the mode sensor triggers 118d and 118e and the tablet communication interface 116. The second portion 108 can include the first user input portion 120, the second user input portion 122, the first tablet stop 124, and the second tablet stop 126.

The mode sensor triggers 118d and 118e can be used to trigger or activate the mode sensors 110d and 110e. More specifically, the mode sensor trigger 118d can be used to trigger or activate the mode sensor 110d and the mode sensor trigger 118e can be used to trigger or activate the mode sensor 110e. The mode sensors 110d and 110e can communicate with the configuration engine 112 to help determine the mode or configuration of the tablet 102b and the accessory 104b. The accessory communication interface 114 in the tablet 102b can communicate with the tablet communication interface 116 in the accessory 104b to activate or deactivate the first user input portion 120 and to activate or deactivate the second user input portion 122.

As illustrated in FIG. 2D, the tablet 102b is coupled to the accessory 104b in the media mode configuration and the user (not shown) is using the tablet 102b primary for viewing the display. More specifically, the tablet 102b has been tilted and is supported by the second tablet stop 126. In the media mode configuration, the user cannot or should not interact with the first user input portion 120 as the first user input portion 120 is blocked by the tablet 102b but the user can interact with the second user input portion 122. In the media mode configuration, the mode sensor 110d is not triggered or activated by the mode sensor trigger 118d and the mode sensor 110e is not triggered or activated by the mode sensor trigger 118e. The mode sensors 110d and 110e can communicate with the configuration engine 112 that they are not triggered to help determine that the mode or configuration of the tablet 102b and the accessory 104b is the media mode configuration. The accessory communication interface 114 in the tablet 102b can communicate with the tablet communication interface 116 in the accessory 104b to deactivate the first user input portion 120 to save power and help prevent accidental usage of the first user input portion 120 (e.g., an accidental keypress if the first user input portion 120 is a keyboard) and to activate the second user input portion 122 in the media mode configuration to allow the user to use the second user input portion 122 (e.g., to pause or play a video being displayed on the tablet 102b if the second user input portion 122 is a touchpad).

Figure 2E:
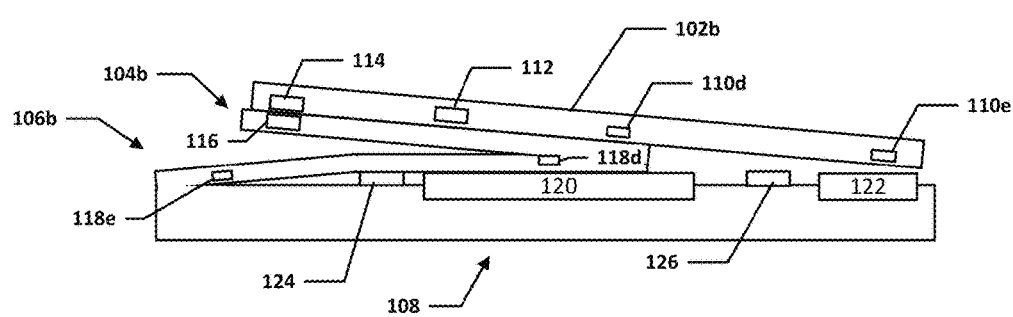

Turning to FIG. 2E, FIG. 2E is a simplified block diagram of the tablet 102b coupled to the accessory 104b in a tablet mode configuration. The tablet 102b can include the mode sensors 110d and 110e, the configuration engine 112, and the accessory communication interface 114. The accessory 104b can include the first portion 106b and the second portion 108. The first portion 106b of the accessory 104a can include the mode sensor triggers 118d and 118e and the tablet communication interface 116. The second portion 108 can include the first user input portion 120, the second user input portion 122, the first tablet stop 124, and the second tablet stop 126.

The mode sensor triggers 118d and 118e can be used to trigger or activate the mode sensors 110d and 110e. More specifically, the mode sensor trigger 118d can be used to trigger or activate the mode sensor 110d and the mode sensor trigger 118e can be used to trigger or activate the mode sensor 110e. The mode sensors 110d and 110e can communicate with the configuration engine 112 to help determine the mode or configuration of the tablet 102b and the accessory 104b. The accessory communication interface 114 in the tablet 102b can communicate with the tablet communication interface 116 in the accessory 104b to activate or deactivate the first user input portion 120 and to activate or deactivate the second user input portion 122.

As illustrated in FIG. 2E, the tablet 102b is coupled to the accessory 104b in the tablet mode configuration and the user (not shown) is using the tablet 102b and not the first user input portion 120 nor the second user input portion 122. In the tablet mode configuration, the user cannot or should not interact with the first user input portion 120 and the second user input portion 122 as the first user input portion 120 and the second user input portion 122 are blocked by the tablet 102b. In the tablet mode configuration, the mode sensor 110d is not triggered or activated by the mode sensor trigger 118d and the mode sensor 110e is semi-triggered or semi-activated by the mode sensor trigger 118e. More specifically, if the mode sensor 110e is a capacity-based proximity sensor, the mode sensor trigger 118e will trigger a relatively weak capacitance or a capacitance below a predetermined threshold and cause the mode sensor 110e to be semi-triggered or semi-activated by the mode sensor trigger 118e.

The mode sensor 110d can communicate with the configuration engine 112 that it is not triggered and the mode sensor 110e can communicate with the configuration engine 112 that it is semi-triggered or semi-activated to help determine that the mode or configuration of the tablet 102b and the accessory 104b is the tablet mode configuration. The accessory communication interface 114 in the tablet 102b can communicate with the tablet communication interface 116 in the accessory 104b to deactivate the first user input portion 120 and the second user input portion 122 to save power and help prevent accidental input (e.g., an accidental keypress if the first user input portion 120 is a keyboard). The tablet 102b can be can be a portable electronic, notebook tablet, tablet computer, notebook computer, digital art board, digital graphic tablet, sealed display, etc. The accessory 104ba can be powered by an onboard battery, by the tablet 102b (e.g., using the tablet communication interface 116 or some other power connection), an AC power source, a wall socket, or some other power source (e.g., an external battery, etc.).

Figure 3A:
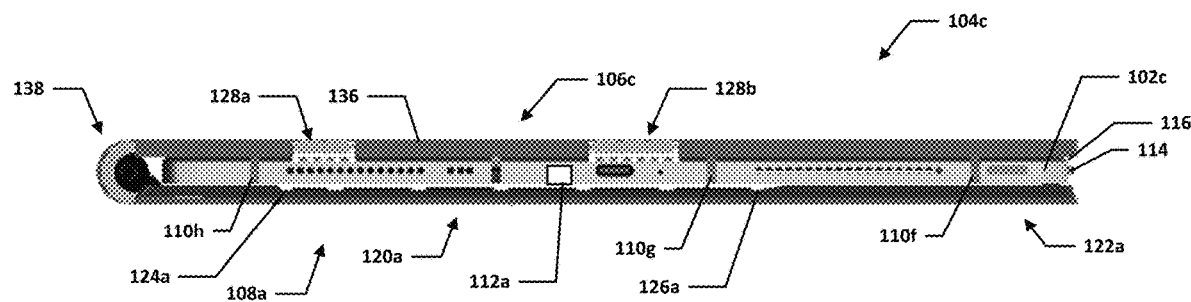
FIGS. 3A-3E are a simplified block diagrams of a system to enable a tablet and accessory with configuration detection, in accordance with an embodiment of the present disclosure.

FIG. 3A is a simplified block diagram of a tablet 102c coupled to an accessory 104c in a closed configuration. The tablet 102c can include capacitive based mode sensors 110f-110h, the configuration engine 112, and the accessory communication interface 114. The accessory 104c can include the first portion 106c and the second portion 108a. The first portion 106c and the second portion 108a can be rotatably or pivotably coupled together using a hinge 138. The first portion 106c of the accessory 104c can include the tablet communication interface 116, mode sensor triggering material 136, and one or more bendable portions 128. For example, as illustrated in FIG. 3A, the first portion 106c of the accessory 104c includes a first bendable portion 128a and a second bendable portion 128b. The second portion 108a can include a first user input portion 120a, a second user input portion 122a, a first tablet stop 124a, and a second tablet stop 126.

In a specific example, one or more of the capacitive based mode sensors 110f-110h may be a SAR sensor. The mode sensor triggering material 136 can be used to trigger or activate the capacitive based mode sensors 110f-110h. The capacitive based mode sensors 110f-110h can communicate with the configuration engine 112 to help determine the mode or configuration of the tablet 102c and the accessory 104c. The accessory communication interface 114 in the tablet 102c can communicate with the tablet communication interface 116 in the accessory 104c to activate or deactivate the first user input portion 120a and to activate or deactivate the second user input portion 122a, depending on the determined mode or configuration of the tablet 102c.

As illustrated in FIG. 3A, the tablet 102c is coupled to the accessory 104c in the closed configuration and the capacitive based mode sensor 110f is triggered or activated by the induced capacitance from the mode sensor triggering material 136 and by the induced capacitance from the second portion 108a of the accessory 104c, the capacitive based mode sensor 110g is triggered or activated by the induced capacitance from the mode sensor triggering material 136 and by the induced capacitance from the second portion 108a of the accessory 104c, and the capacitive based mode sensor 110h is triggered or activated by the induced capacitance from the mode sensor triggering material 136 and by the induced capacitance from the second portion 108a of the accessory 104c. Each of the capacitive based mode sensors 110f-110h can communicate with the configuration engine 112 that they were triggered or activated to help determine that the mode or configuration of the tablet 102c and the accessory 104c is the closed configuration. The accessory communication interface 114 in the tablet 102c can communicate with the tablet communication interface 116 in the accessory 104c to deactivate the first user input portion 120 and the second user input portion 122 in the closed configuration to save power and help prevent accidental input (e.g., an accidental keypress if the first user input portion 120 is a keyboard).

Figure 3B:
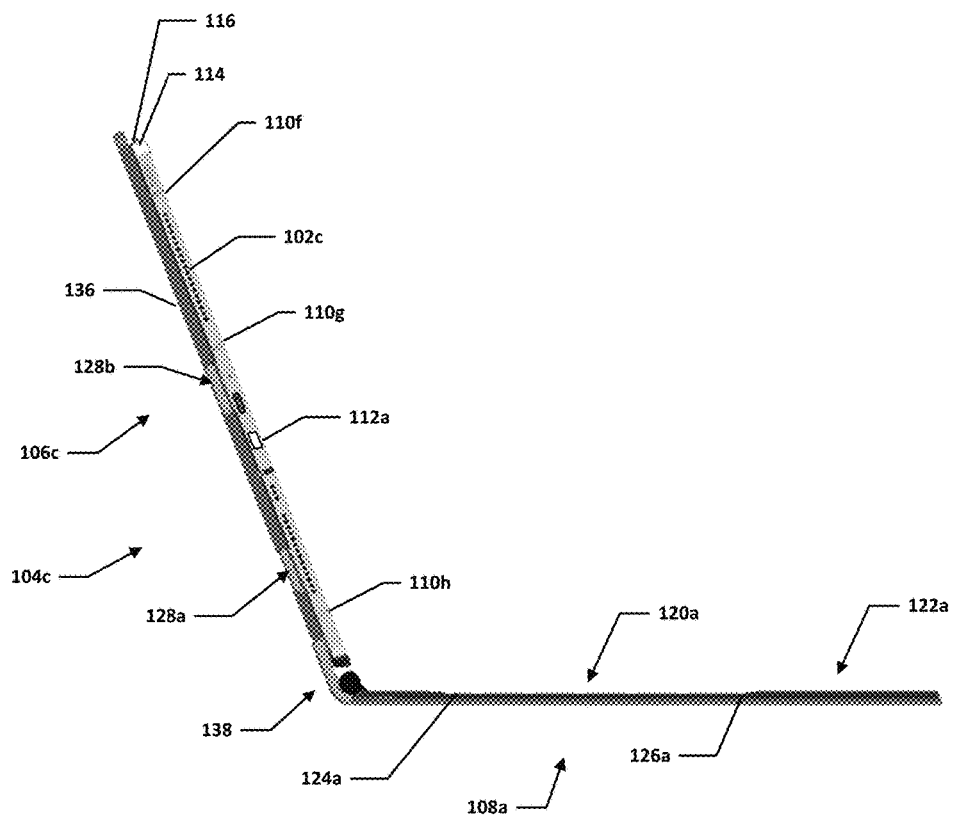

Turning to FIG. 3B, FIG. 3B is a simplified block diagram of the tablet 102c coupled to the accessory 104c in an open configuration (note that the open configuration is similar to the transitioning to open configuration illustrated in FIGS. 1C and 2B). The tablet 102c can include the capacitive based mode sensors 110f-110h, the configuration engine 112, and the accessory communication interface 114. The accessory 104c can include the first portion 106c and the second portion 108a. The first portion 106c and the second portion 108a can be rotatably or pivotably coupled together using the hinge 138. The first portion 106c of the accessory 104c can include the tablet communication interface 116, the mode sensor triggering material 136, and one or more bendable portions 128. For example, as illustrated in FIG. 3B, the first portion 106c of the accessory 104c includes the first bendable portion 128a and the second bendable portion 128b. The second portion 108a can include the first user input portion 120a, the second user input portion 122a, the first tablet stop 124a, and the second tablet stop 126.

As illustrated in FIG. 3B, the tablet 102c is coupled to the accessory 104c in an open configuration and a user would be using the first user input portion 120 and the second user input portion 122. The hinge 138 can be configured to hold or secure the tablet 102c and the accessory 104c in the open configuration. Similar to the closed configuration, in the transitioning to open configuration, the capacitive based mode sensor 110f is triggered or activated by the inducted capacitance from the mode sensor triggering material 136 (and not by the induced capacitance from the second portion 108a of the accessory 104c), the capacitive based mode sensor 110g is triggered or activated by the inducted capacitance from the mode sensor triggering material 136 (and not by the induced capacitance from the second portion 108a of the accessory 104c), and the capacitive based mode sensor 110h is triggered or activated by the inducted capacitance from the mode sensor triggering material 136 (and not by the induced capacitance from the second portion 108a of the accessory 104c). Note that, the capacitive based mode sensors 110f-110h are not triggered by the induced capacitance from the second portion 108a of the accessory 104c and the induced capacitance of the capacitive based mode sensors 110f-110h would be less than the induced capacitance detected by the capacitive based mode sensors 110f-110h in the close configuration illustrated in FIG. 3A. Each of the mode sensors 110a-110c can communicate with the configuration engine 112 that they were triggered or activated to help determine that the mode or configuration of the tablet 102c and the accessory 104c is the open configuration. The accessory communication interface 114 in the tablet 102c can communicate with the tablet communication interface 116 in the accessory 104c to activate the first user input portion 120a and the second user input portion 122a in the open configuration to allow the user to use the first user input portion 120a and the second user input portion 122a.

Figure 3C:
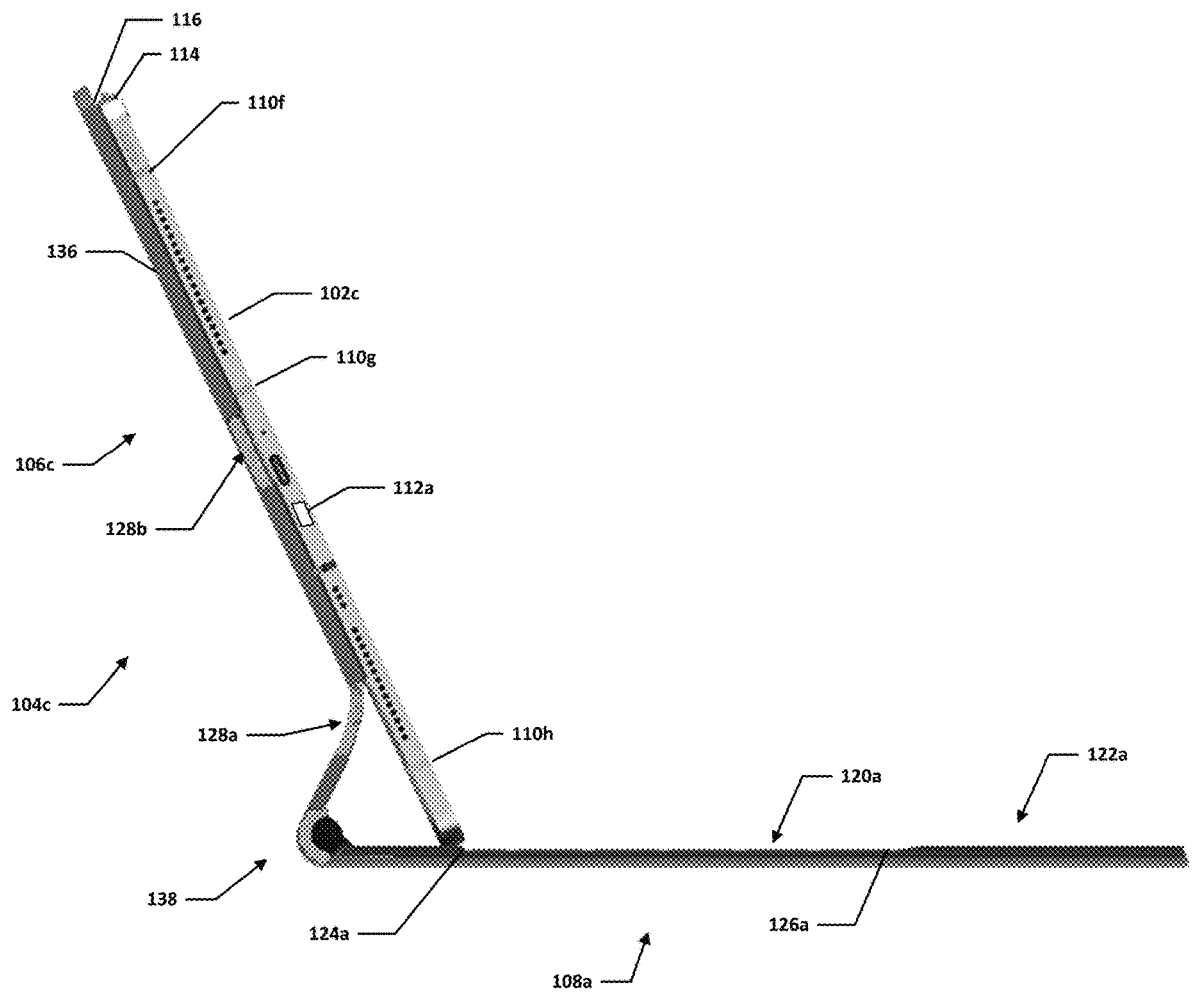

Turning to FIG. 3C, FIG. 3C is a simplified block diagram of the tablet 102c coupled to the accessory 104a in a clamshell mode configuration. The tablet 102c can include the capacitive based mode sensors 110f-110h, the configuration engine 112, and the accessory communication interface 114. The accessory 104c can include the first portion 106c and the second portion 108a. The first portion 106c and the second portion 108a can be rotatably or pivotably coupled together using the hinge 138. The first portion 106c of the accessory 104c can include the tablet communication interface 116, the mode sensor triggering material 136, and one or more bendable portions 128. For example, as illustrated in FIG. 3C, the first portion 106c of the accessory 104c includes the first bendable portion 128a and the second bendable portion 128b. The second portion 108a can include the first user input portion 120a, the second user input portion 122a, the first tablet stop 124a, and the second tablet stop 126.

As illustrated in FIG. 3C, the tablet 102c is coupled to the accessory 104c in the clamshell mode configuration and the user (not shown) is using the tablet 102c similar to a laptop computer. More specifically, the tablet 102c has been tilted and is supported by the first tablet stop 124a. In the clamshell mode configuration, the user can interact with the first user input portion 120a and the second user input portion 122a. In the clamshell mode configuration, the capacitive based mode sensor 110f is triggered or activated by the inducted capacitance from the mode sensor triggering material 136 (and not by the induced capacitance from the second portion 108a of the accessory 104c), the capacitive based mode sensor 110*g* is triggered or activated by the induced capacitance from the mode sensor triggering material 136 (and not by the induced capacitance from the second portion 108*a* of the accessory 104*c*), and the capacitive based mode sensor 110*h* is not triggered or activated by the induced capacitance from the mode sensor triggering material 136 or by the induced capacitance from the second portion 108*a* of the accessory 104*c*. The capacitive based mode sensors 110*f* and 110*g* can communicate with the configuration engine 112 that they are triggered or activated and the capacitive based mode sensor 110*h* can communicate with the configuration engine 112 that it is not triggered to help determine that the mode or configuration of the tablet 102*c* and the accessory 104*c* is the clamshell mode configuration. The accessory communication interface 114 in the tablet 102*c* can communicate with the tablet communication interface 116 in the accessory 104*c* to activate the first user input portion 120*a* and the second user input portion 122*a* in the clamshell mode configuration to allow the user to use the first user input portion 120*a* and the second user input portion 122*a*.

Figure 3D:
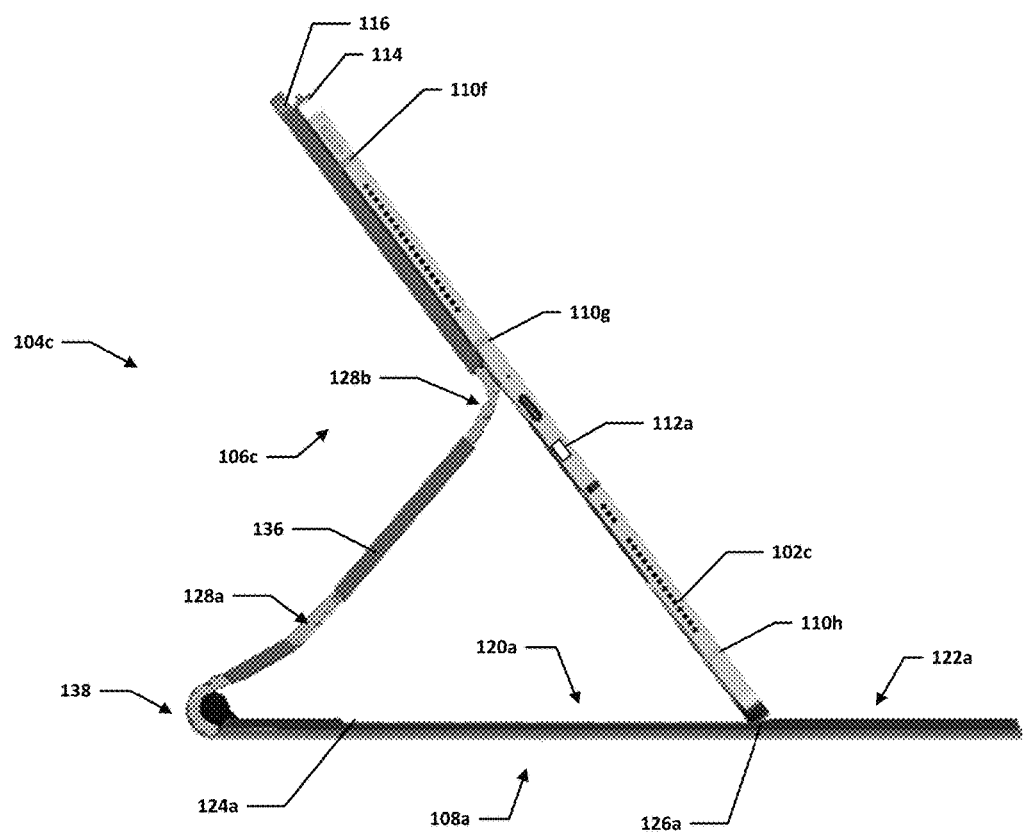

Turning to FIG. 3D, FIG. 3D is a simplified block diagram of the tablet 102*c* coupled to the accessory 104*a* in a media mode configuration. The tablet 102*c* can include the capacitive based mode sensors 110*f*-110*h*, the configuration engine 112, and the accessory communication interface 114. The accessory 104*c* can include the first portion 106*c* and the second portion 108*a*. The first portion 106*c* and the second portion 108*a* can be rotatably or pivotably coupled together using the hinge 138. The first portion 106*c* of the accessory 104*c* can include the tablet communication interface 116, the mode sensor triggering material 136, and one or more bendable portions 128. For example, as illustrated in FIG. 3D, the first portion 106*c* of the accessory 104*c* includes the first bendable portion 128*a* and the second bendable portion 128*b*. The second portion 108*a* can include the first user input portion 120*a*, the second user input portion 122*a*, the first tablet stop 124*a*, and the second tablet stop 126.

As illustrated in FIG. 3D, the tablet 102*c* is coupled to the accessory 104*c* in the media mode configuration and the user (not shown) is using the tablet 102*c* primary for viewing the display (e.g., the user is watching a video or movie). More specifically, the tablet 102*c* has been tilted and is supported by the second tablet stop 126*a*. In the media mode configuration, the user cannot or should not interact with the first user input portion 120*a* as the first user input portion 120*a* is blocked by the tablet 102*c* but the user can interact with the second user input portion 122*a*. In the media mode configuration, the capacitive based mode sensor 110*f* is triggered or activated by the induced capacitance from the mode sensor triggering material 136 (and not by the induced capacitance from the second portion 108*a* of the accessory 104*c*), the capacitive based mode sensor 110*g* is not triggered or activated by the induced capacitance from the mode sensor triggering material 136 or by the induced capacitance from the second portion 108*a* of the accessory 104*c*, and the capacitive based mode sensor 110*h* is not triggered or activated by the induced capacitance from the mode sensor triggering material 136 or by the induced capacitance from the second portion 108*a* of the accessory 104*c*. The capacitive based mode sensor 110*f* can communicate with the configuration engine 112 that it is triggered or activated and the capacitive based mode sensors 110*g* and 110*h* can communicate with the configuration engine 112 that they are not triggered to help determine that the mode or configuration of the tablet 102*c* and the accessory 104*c* is in the media mode configuration. The accessory communication interface 114 in the tablet 102*c* can communicate with the tablet communication interface 116 in the accessory 104*c* to deactivate the first user input portion 120*a* to save power and help prevent accidental usage of the first user input portion 120*a* (e.g., an accidental keypress if the first user input portion 120*a* is a keyboard) and to activate the second user input portion 122*a* in the media mode configuration to allow the user to use the second user input portion 122*a* (e.g., to pause or play a video being displayed on the tablet 102*c* if the second user input portion 122*a* is a touchpad).

Figure 3E:
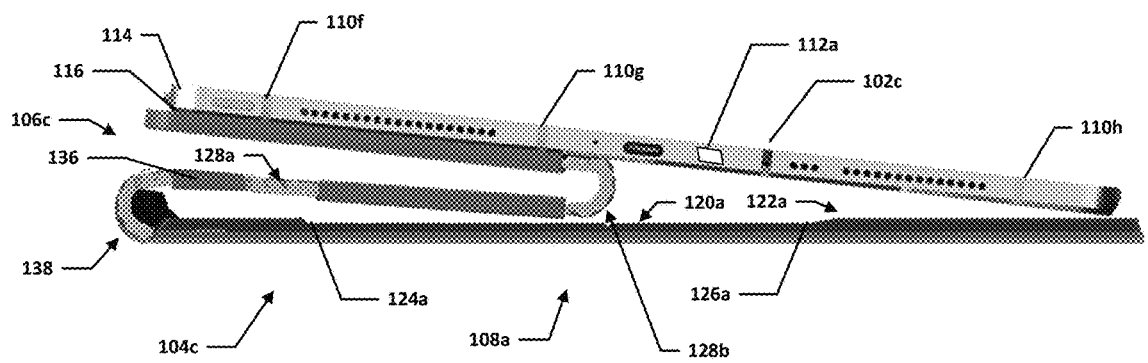

Turning to FIG. 3E, FIG. 3E is a simplified block diagram of the tablet 102*c* coupled to the accessory 104*a* in a tablet mode configuration. The tablet 102*c* can include the capacitive based mode sensors 110*f*-110*h*, the configuration engine 112, and the accessory communication interface 114. The accessory 104*c* can include the first portion 106*c* and the second portion 108*a*. The first portion 106*c* and the second portion 108*a* can be rotatably or pivotably coupled together using the hinge 138. The first portion 106*c* of the accessory 104*c* can include the tablet communication interface 116, the mode sensor triggering material 136, and one or more bendable portions 128. For example, as illustrated in FIG. 3E, the first portion 106*c* of the accessory 104*c* includes the first bendable portion 128*a* and the second bendable portion 128*b*. The second portion 108*a* can include the first user input portion 120*a*, the second user input portion 122*a*, the first tablet stop 124*a*, and the second tablet stop 126.

As illustrated in FIG. 3E, the tablet 102*c* is coupled to the accessory 104*c* in the tablet mode configuration and the user (not shown) is using the tablet 102*c* and not the first user input portion 120*a* nor the second user input portion 122*a*. In the tablet mode configuration, the user cannot or should not interact with the first user input portion 120*a* and the second user input portion 122*a* as the first user input portion 120*a* and the second user input portion 122*a* are blocked by the tablet 102*a*. In the tablet mode configuration, the capacitive based mode sensor 110*f* and 110*g* are triggered or activated by the inducted capacitance from the mode sensor triggering material 136 (and not by the induced capacitance from the second portion 108*a* of the accessory 104*c*) and the capacitive based mode sensor 110*h* is semi-triggered or semi-activated by the second portion 108*a* of the accessory 104*c* but not from the inducted capacitance from the mode sensor triggering material 136. For example, if the capacitive based mode sensor 110*h* is a SAR proximity sensor, the second user input portion 122*a* will trigger a relatively weak capacitance or a capacitance below a predetermined threshold and cause the capacitive based mode sensor 110*h* to be semi-triggered or semi-activated by the second user input portion 122*a*.

The capacitive based mode sensor 110*f* and 110*g* can communicate with the configuration engine 112 that they are triggered or activated and the capacitive based mode sensor 110*h* can communicate with the configuration engine 112 that it is semi-triggered or semi-activated to help determine that the mode or configuration of the tablet 102*c* and the accessory 104*c* is the tablet mode configuration. The accessory communication interface 114 in the tablet 102*c* can communicate with the tablet communication interface 116 in the accessory 104*c* to deactivate the first user input portion 120 and the second user input portion 122 to save power and help prevent accidental input (e.g., an accidental keypress if the first user input portion 120 is a keyboard).

The tablet 102*c* can be can be a portable electronic, notebook tablet, tablet computer, notebook computer, digital art board, digital graphic tablet, sealed display, etc. The tablet 102c can include one or more processors, memory, a display, and electronics. The display can be a touchscreen display or any other suitable display screen system. Each of the electronics can be a device or group of devices available to assist in the operation or function of the tablet 102c. The accessory 104c can also include one or more processors, memory, and electronics. Each of the electronics can be a device or group of devices available to assist in the operation or function of the accessory 104c. The accessory 104c can be powered by an onboard battery, by the tablet 102c (e.g., using the tablet communication interface 116 or some other power connection), an AC power source, a wall socket, or some other power source (e.g., an external battery, etc.).

Figure 4:
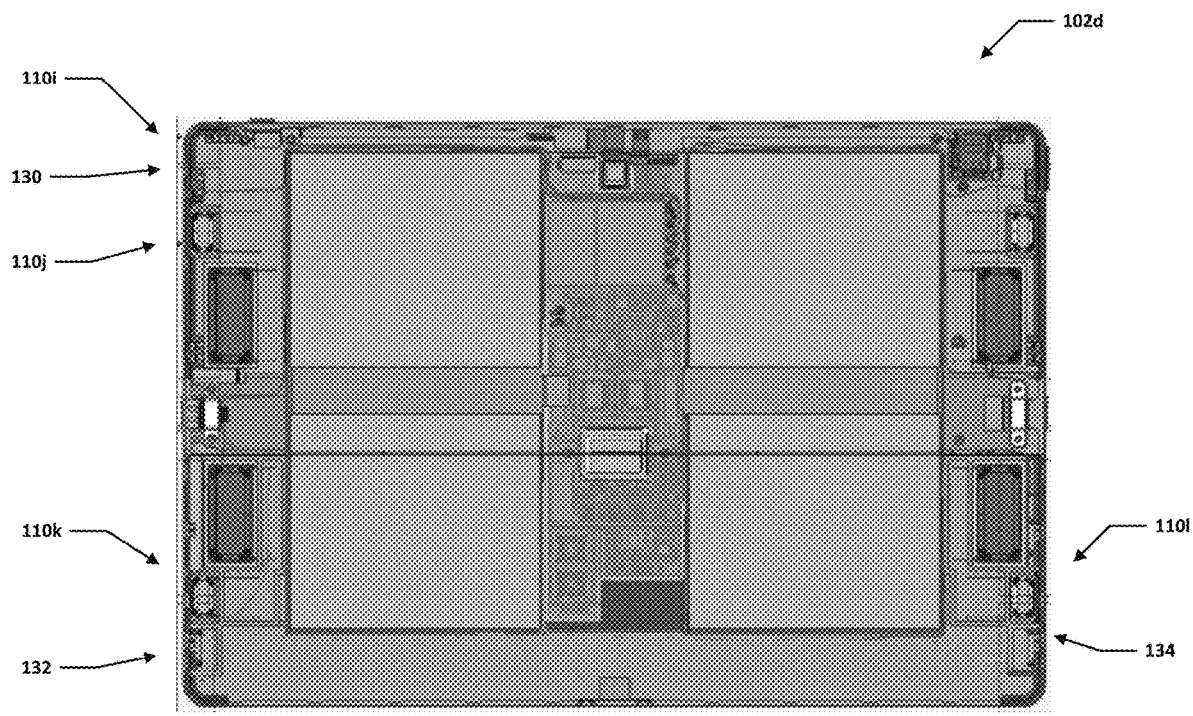
FIG. 4 is a simplified block diagram of a system to enable a tablet and accessory with configuration detection, in accordance with an embodiment of the present disclosure.

Turning to FIG. 4, FIG. 4 is a simplified block diagram of a tablet 102d. The tablet 102d can include SAR sensors 110i-110l, a first RF transmitter 130, a second RF transmitter 132, and a third RF transmitter 134. As illustrated in FIG. 4, the tablet 102d includes four SAR branches (the SAR sensors 110i-110l) to control RF emission power in the presence of a user. More specifically, to help control RF emission power in the presence of the user, the SAR sensors 110i and 110j are positioned near the first RF transmitter 130, the SAR sensor 110k is positioned near the second RF transmitter 132, and the SAR sensor 110l is positioned near the third RF transmitter 134.

In an example, each of the first RF transmitter 130, the second RF transmitter 132, and the third RF transmitter 134 can represent a mobile broadband transmitting antenna, a WiFi transmitting antenna, etc. and various combinations may be employed. The SAR sensors 110i-110l are configured to detect external capacitive coupling changes caused by the nearness of a conductive object near the first RF transmitter 130, the second RF transmitter 132, and the third RF transmitter 134 respectively. When the tablet 102d is not coupled to an accessory (e.g., the accessory 104a) the SAR sensors 110i-110l can detect user proximity to the tablet 102d to reduce and control the RF emission power from the first RF transmitter 130, the second RF transmitter 132, and the third RF transmitter 134 when the tablet 102d is in the presence of the user. When the tablet 102d is coupled to an accessory the SAR sensors 110i-110l can be used to help determine the configuration of the tablet 102d. The tablet 102d can be can be a portable electronic, notebook tablet, tablet computer, notebook computer, digital art board, digital graphic tablet, sealed display, etc.

Figure 5:
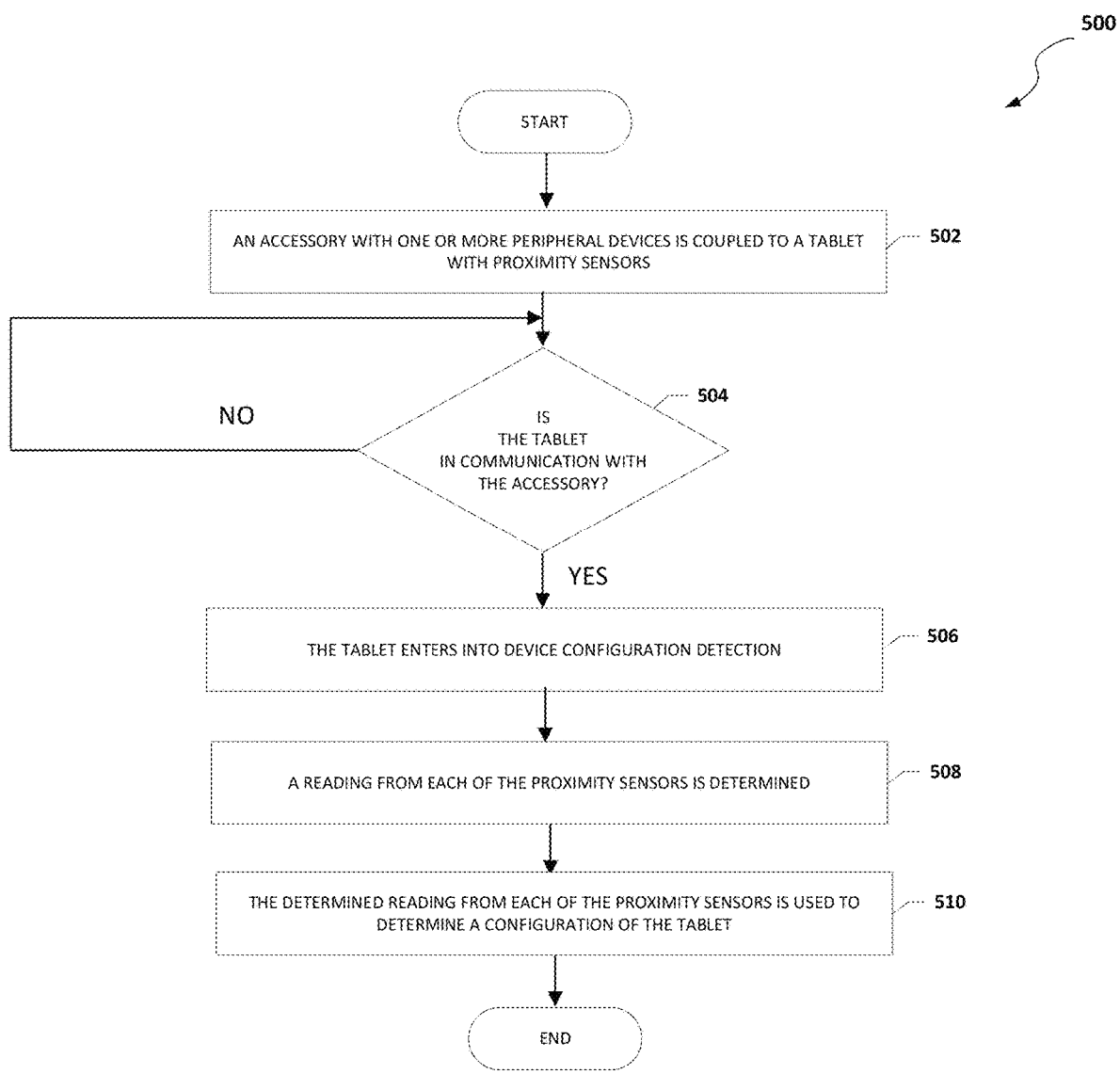
FIG. 5 is a simplified flowchart illustrating potential operations that may be associated with the system in accordance with an embodiment.

Turning to FIG. 5, FIG. 5 is an example flowchart illustrating possible operations of a flow 500 that may be associated with a tablet and accessory with configuration detection, in accordance with an embodiment. In an embodiment, one or more operations of flow 500 may be performed by the mode sensors 110a-110c in the tablet 102a, the mode sensors 110d and 110e in the tablet 102b, the capacitive based modes sensors 110f-110h in the tablet 102c, the SAR sensors 110i-110l in the tablet 102d, the configuration engine 112, the accessory communication interface 114, the mode sensor triggers 118a-118c, the tablet communication interface 116, and/or the mode sensor triggering material 136. At 502, an accessory with one or more peripheral devices is coupled to a tablet with proximity sensors. For example, the tablet 102a can include the mode sensor 110a-110c and the accessory 104a can include the first user input portion 120 and the second user input portion 122. The accessory 104a can be coupled to the tablet 102a. At 504, the system determines if the tablet is in communication with the accessory. In some examples, the accessory is coupled to the tablet and the tablet is in communication with the accessory using the accessory using a communication interface (e.g., the accessory communication interface 114 and a tablet communication interface (e.g., the tablet communication interface 116) and a user intends to use one or more user inputs located on the accessory. In other examples, the accessory is coupled to the tablet and the tablet is not in communication with the accessory because the user intends to use the accessory as storage for the tablet and not the one or more user inputs located on the accessory. If the tablet is not in communication with the accessory, then the system returns to 404 and again determines if the tablet is in communication with the accessory. If the tablet is in communication with the accessory, then the tablet enters into device configuration detection, as in 506. At 508, a reading from each of the proximity sensors is determined. At 510, the determined readings from each of the proximity sensors is used to determine a configuration of the tablet. Based on the configuration of the tablet, one or more of the peripheral devices can be enabled or disabled.

Figure 6:
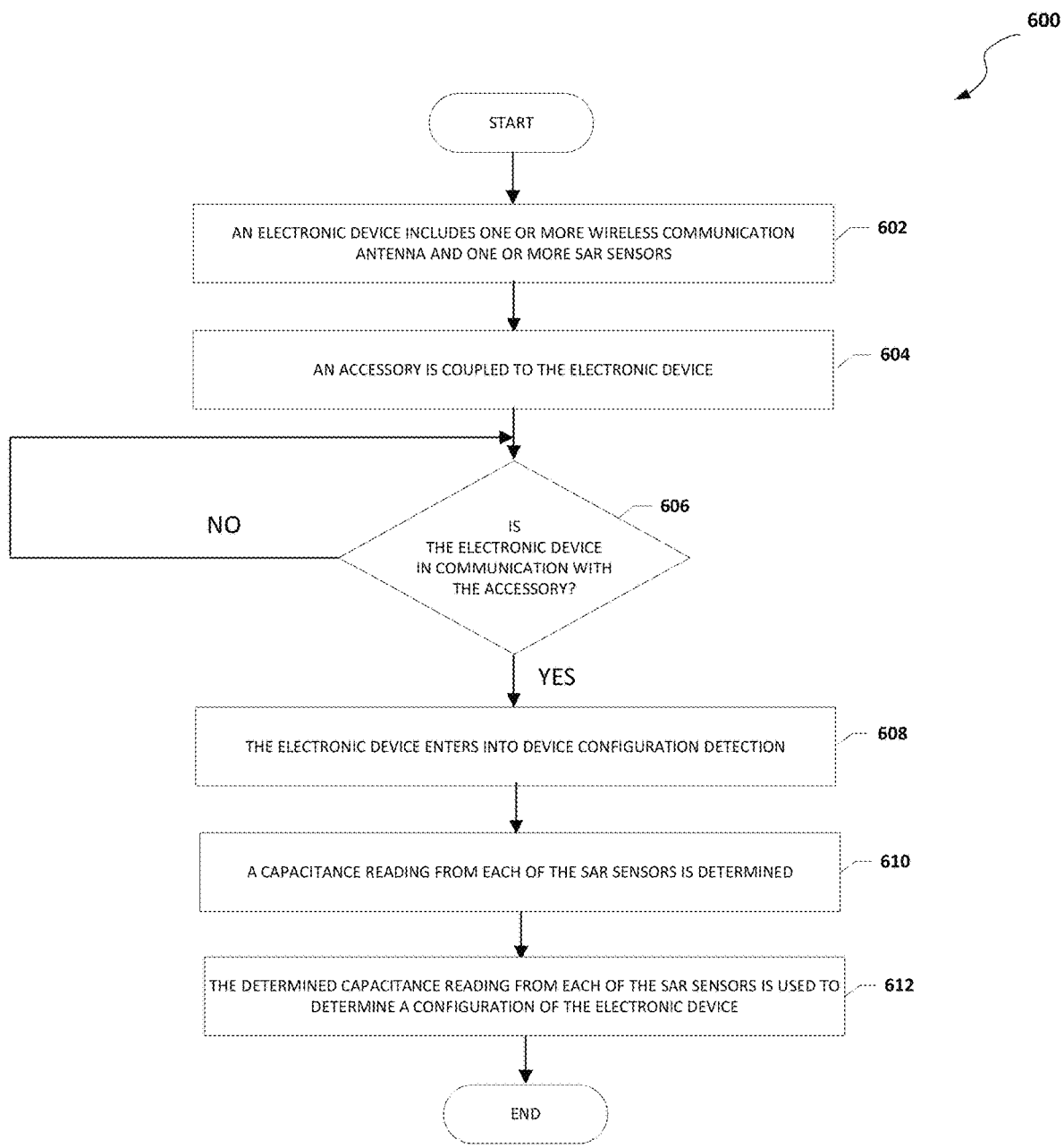
FIG. 6 is a simplified flowchart illustrating potential operations that may be associated with the system in accordance with an embodiment.

Turning to FIG. 6, FIG. 6 is an example flowchart illustrating possible operations of a flow 600 that may be associated with a tablet and accessory with configuration detection, in accordance with an embodiment. In an embodiment, one or more operations of flow 600 may be performed by the mode sensors 110a-110c in the tablet 102a, the mode sensors 110d and 110e in the tablet 102b, the capacitive based modes sensors 110f-110h in the tablet 102c, the SAR sensors 110i-110l in the tablet 102d, the configuration engine 112, the accessory communication interface 114, the mode sensor triggers 118a-118c, the tablet communication interface 116, and/or the mode sensor triggering material 136. At 602, an electronic device includes one or more wireless communication antenna and one or more SAR sensors. For example, the tablet 102d includes the first RF transmitter 130, the second RF transmitter 132, and the third RF transmitter 134 (where each of the first RF transmitter 130, the second RF transmitter 132, and the third RF transmitter 134 represents a mobile broadband transmitting antenna, a WiFi transmitting antenna, etc.) and the SAR sensors 110f-110i. The SAR sensors 110f-110i are configured to detect external capacitive coupling changes caused by the nearness of a conductive object near the first RF transmitter 130, the second RF transmitter 132, and the third RF transmitter 134 respectively and help detect user proximity to the electronic device to reduce and control the RF emission power from the tablet 102d in the presence of the user.

At 604, an accessory is coupled to the electronic device. At 606, the system determines if the electronic device is in communication with the accessory. In some examples, the accessory is coupled to the electronic device and the electronic device is in communication with the tab electronic device and a user intends to use one or more user inputs located on the accessory. In other examples, the accessory is coupled to the electronic device and the electronic device is not in communication with the accessory because the user intends to use the accessory as storage for the electronic device and not use the one or more user inputs located on the accessory. If the electronic device is not in communication with the accessory, then the system returns to 606 and again determines if the electronic device is in communication with the accessory.

If the system determines the electronic device is in communication with the accessory, then the electronic device enters into device configuration detection, as in 608. In an example, when the electronic device enters into device configuration detection, the SAR sensors are used to help determine the configuration of the electronic device. At 610, a capacitance reading from each of the SAR sensors is determined. At 612, the determined capacitance reading from each of the SAR sensors is used to determine a configuration of the electronic device.

Figure 7:
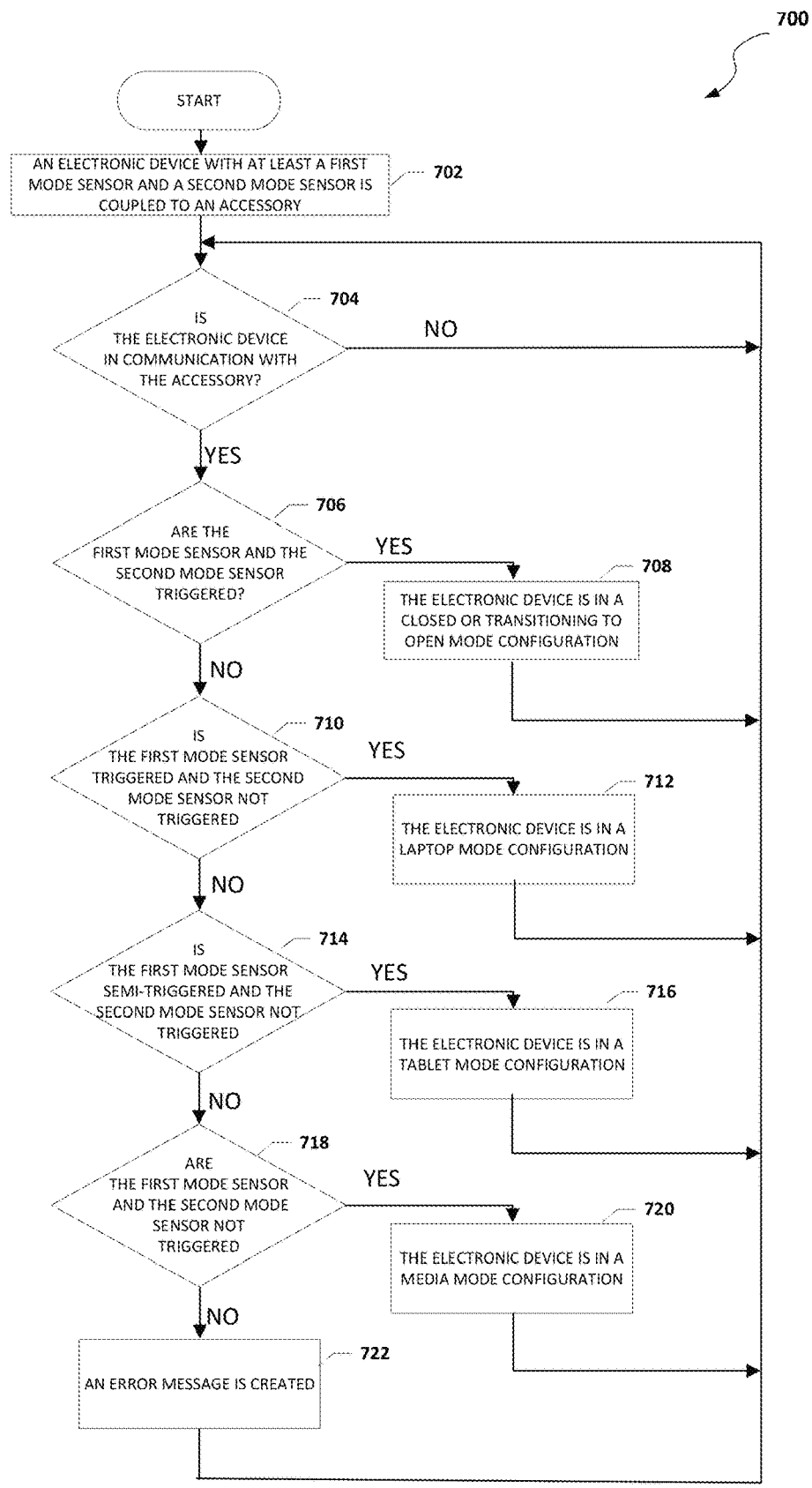
FIG. 7 is a simplified flowchart illustrating potential operations that may be associated with the system in accordance with an embodiment.

Turning to FIG. 7, FIG. 7 is an example flowchart illustrating possible operations of a flow 700 that may be associated with a tablet and accessory with configuration detection, in accordance with an embodiment. In an embodiment, one or more operations of flow 700 may be performed by the mode sensors 110*a*-110*c* in the tablet 102*a*, the mode sensors 110*d* and 110*e* in the tablet 102*b*, the capacitive based modes sensors 110*f*-110*h* in the tablet 102*c*, the SAR sensors 110*i*-110*l* in the tablet 102*d*, the configuration engine 112, the accessory communication interface 114, the mode sensor triggers 118*a*-118*c*, the tablet communication interface 116, and/or the mode sensor triggering material 136. At 702, an electronic device with at least a first mode sensor and a second mode sensor is coupled to an accessory. At 704, the system determines if the electronic device is in communication with the accessory. If the electronic device is not in communication with the accessory, then the system returns to 704 and again determines if the electronic device is in communication with the accessory.

If the electronic device is in communication with the accessory, then the system determines if the first mode sensor and the second mode sensor are triggered, as in 706. If the first mode sensor and the second mode sensor are triggered, then the electronic device is in a closed or transitioning to open mode configuration, as in 708 and the system returns to 704 and determines if the electronic device is in communication with the accessory. If the electronic device is in a closed or transitioning to open mode configuration, then user inputs on the accessory can be disabled so they are not consuming power and/or are not unintentionally used.

If the first mode sensor and the second mode sensor are not triggered, then the system determines if the first mode sensor is triggered and the second mode sensor is not triggered, as in 710. If the first mode sensor is triggered and the second mode sensor is not triggered, then the electronic device is in a laptop mode configuration, as in 712 and the system returns to 704 and determines if the electronic device is in communication with the accessory. If the electronic is in a laptop mode configuration, then the user inputs on the accessory can be enabled to allow the user to use the user inputs.

If the first mode sensor is not triggered and/or the second mode sensor is triggered, then the system determines if the first mode sensor is semi-triggered and the second mode sensor is not triggered, as in 714. If the first mode sensor is semi-triggered and the second mode sensor is not triggered, then the electronic device is in a tablet mode configuration, as in 716 and the system returns to 704 and determines if the electronic device is in communication with the accessory. If the electronic device is in a tablet mode configuration, then user inputs on the accessory can be disabled so they are not consuming power and/or are not unintentionally used.

If the first mode sensor is not semi-triggered and the second mode sensor is not triggered, then the system determines if the first mode sensor and the second mode sensor are not triggered, as in 718. If the first mode sensor and the second mode sensor are not triggered, then the electronic device is in a media mode configuration, as in 720 and the system returns to 704 and determines if the electronic device is in communication with the accessory. Otherwise, an error message is created, as in 722 and the system returns to 704 and determines if the electronic device is in communication with the accessory. If the electronic device is in a media mode configuration, then one or more user inputs on the electronic device can be disabled so they are not consuming power and/or are not unintentionally used.

Figure 8:
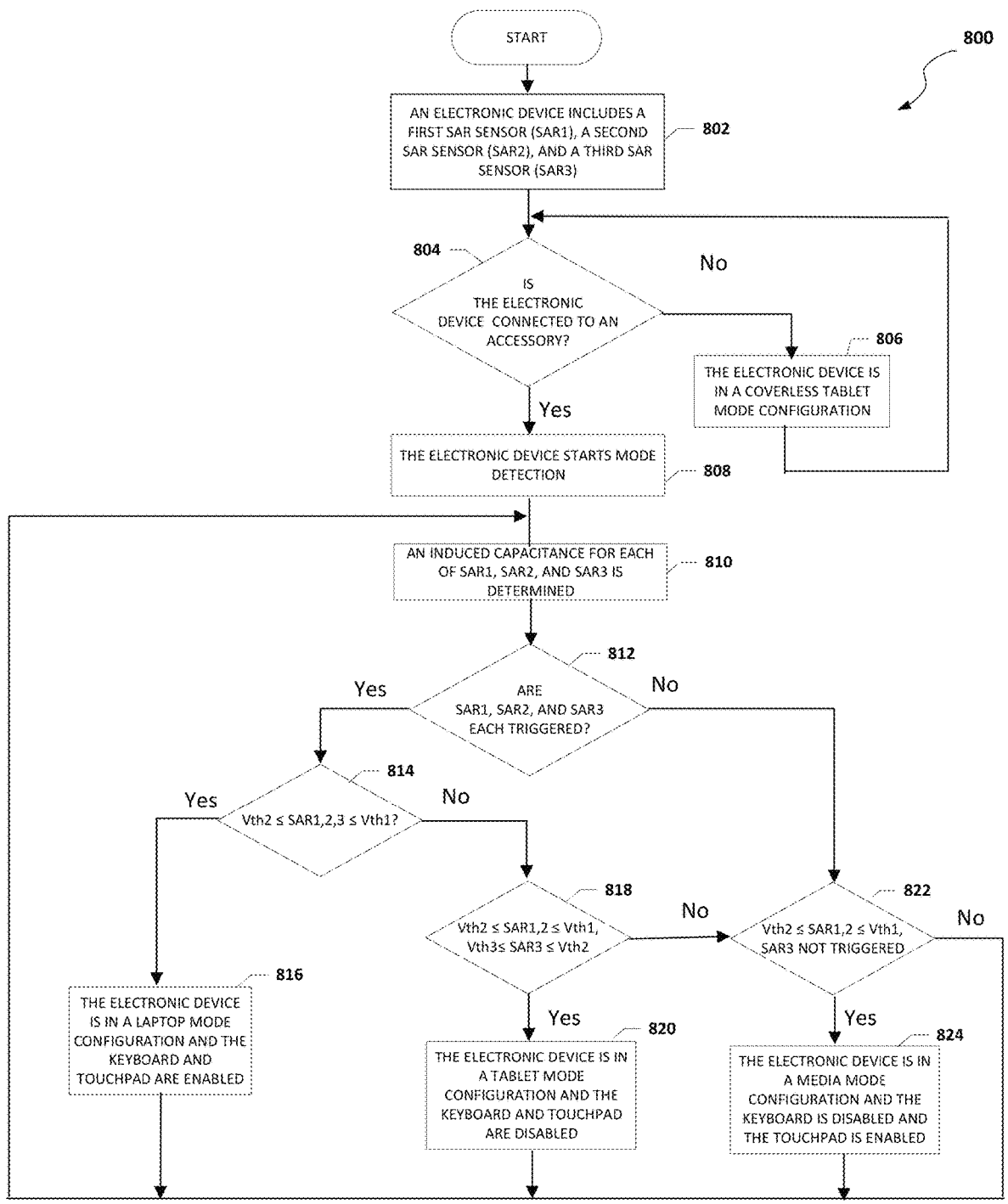
FIG. 8 is a simplified flowchart illustrating potential operations that may be associated with the system in accordance with an embodiment.

Turning to FIG. 8, FIG. 8 is an example flowchart illustrating possible operations of a flow 800 that may be associated with a tablet and accessory with configuration detection, in accordance with an embodiment. In an embodiment, one or more operations of flow 800 may be performed by the mode sensors 110*a*-110*c* in the tablet 102*a*, the mode sensors 110*d* and 110*e* in the tablet 102*b*, the capacitive based modes sensors 110*f*-110*h* in the tablet 102*c*, the SAR sensors 110*i*-110*l* in tablet the 102*d*, the configuration engine 112, the accessory communication interface 114, the mode sensor triggers 118*a*-118*c*, the tablet communication interface 116, and/or the mode sensor triggering material 136. At 802, an electronic device includes a first SAR sensor (SAR1), a second SAR sensor (SAR2), and a third SAR sensor (SAR3). At 804, the system determines if the electronic device is connected to an accessory. If the electronic device is not connected to an accessory, then the electronic device is in a coverless tablet mode configuration, as in 806, and the system returns to 804 and again determines if the electronic device is connected to an accessory.

If the electronic device is connected to an accessory, then the electronic device starts mode detection to determine the configuration of the electronic device, as in 808. In an example, when the electronic device starts mode detection, the SAR sensors are not being used to detect the presence of the user to reduce and control the RF emission power and are used to help determine the configuration of the electronic device. At 810, an induced capacitance for each of SAR1, SAR2, and SAR3 is determined.

At 812, the system determines if each of SAR1, SAR2, and SAR3 are triggered. If each of SAR1, SAR2, and SAR3 are triggered, then the system determines if the induced capacitance of each of SAR1, SAR2, and SAR3 is less than or equal to a first threshold voltage (Vth1) and greater than or equal to a second threshold voltage (Vth2), as in 814. In an example, the first threshold voltage can be the induced capacitance of SAR1, SAR2, and/or SAR3 if SAR1, SAR2, and/or SAR3 were triggered and a user was present and triggered SAR1, SAR2, and SAR3. The second threshold voltage can be the induced capacitance of SAR1, SAR2, and/or SAR3 if SAR1, SAR2, and/or SAR3 were triggered. If the induced capacitance of each of SAR1, SAR2, and SAR3 is less than or equal to a first threshold voltage and greater than or equal to a second threshold voltage, then the device is in a laptop mode configuration and the keyboard and touchpad are enable, as in 816 and the system returns to 810 and again, an interrupt status for each of SAR1, SAR2, and SAR3 is determined.

If the induced capacitance of each of SAR1, SAR2, and SAR3 is not less than or equal to a first threshold voltage and/or not greater than or equal to a second threshold voltage, then the system determines if the induced capacitance of each of SAR1 and SAR2 is less than or equal to a first threshold voltage and greater than or equal to a second threshold voltage and if the induced capacitance of SAR3 is less than or equal to the second threshold voltage and greater than a third threshold voltage (Vth3), as in 818. In an example, the third threshold voltage can be about the induced capacitance of SAR3 if SAR3 was semi-triggered. If the induced capacitance of each of SAR1 and SAR2 is less than or equal to a first threshold voltage and greater than or equal to the second threshold voltage and if the induced capacitance of SAR3 is less than or equal to the second threshold voltage and greater than a third threshold voltage, then the electronic device is in a tablet mode configuration and the keyboard and touchpad are disabled, as in 820 and the system returns to 810 and again, an interrupt status for each of SAR1, SAR2, and SAR3 is determined.

If the induced capacitance of each of SAR1 and SAR2 is not less than or equal to a first threshold voltage and greater than or equal to a second threshold voltage and/or if the induced capacitance of SAR3 is not less than or equal to the second threshold voltage and greater than a third threshold voltage, then the system determines if the induced capacitance of each of SAR1 and SAR2 is less than or equal to a first threshold voltage and greater than or equal to a second threshold voltage and if the induced capacitance of SAR3 is not triggered, as in 822. Going back to 812, if each of SAR1, SAR2, and SAR3 are not triggered, then the system determines if the induced capacitance of each of SAR1 and SAR2 is less than or equal to a first threshold voltage and greater than or equal to a second threshold voltage and if the induced capacitance of SAR3 is not triggered, as in 822. If the system determines the induced capacitance of each of SAR1 and SAR2 is less than or equal to a first threshold voltage and greater than or equal to a second threshold voltage and if the induced capacitance of SAR3 is not triggered, then the electronic device is in a media mode configuration and the keyboard is disabled and the touchpad is enabled, as in 824 and the system returns to 810 and again, an interrupt status for each of SAR1, SAR2, and SAR3 is determined. If the system determines the induced capacitance of each of SAR1 and SAR2 is not less than or equal to a first threshold voltage and greater than or equal to a second threshold voltage and/or if the induced capacitance of SAR3 is triggered, then the system returns to 810 and again, an interrupt status for each of SAR1, SAR2, and SAR3 is determined.

Figure 9:
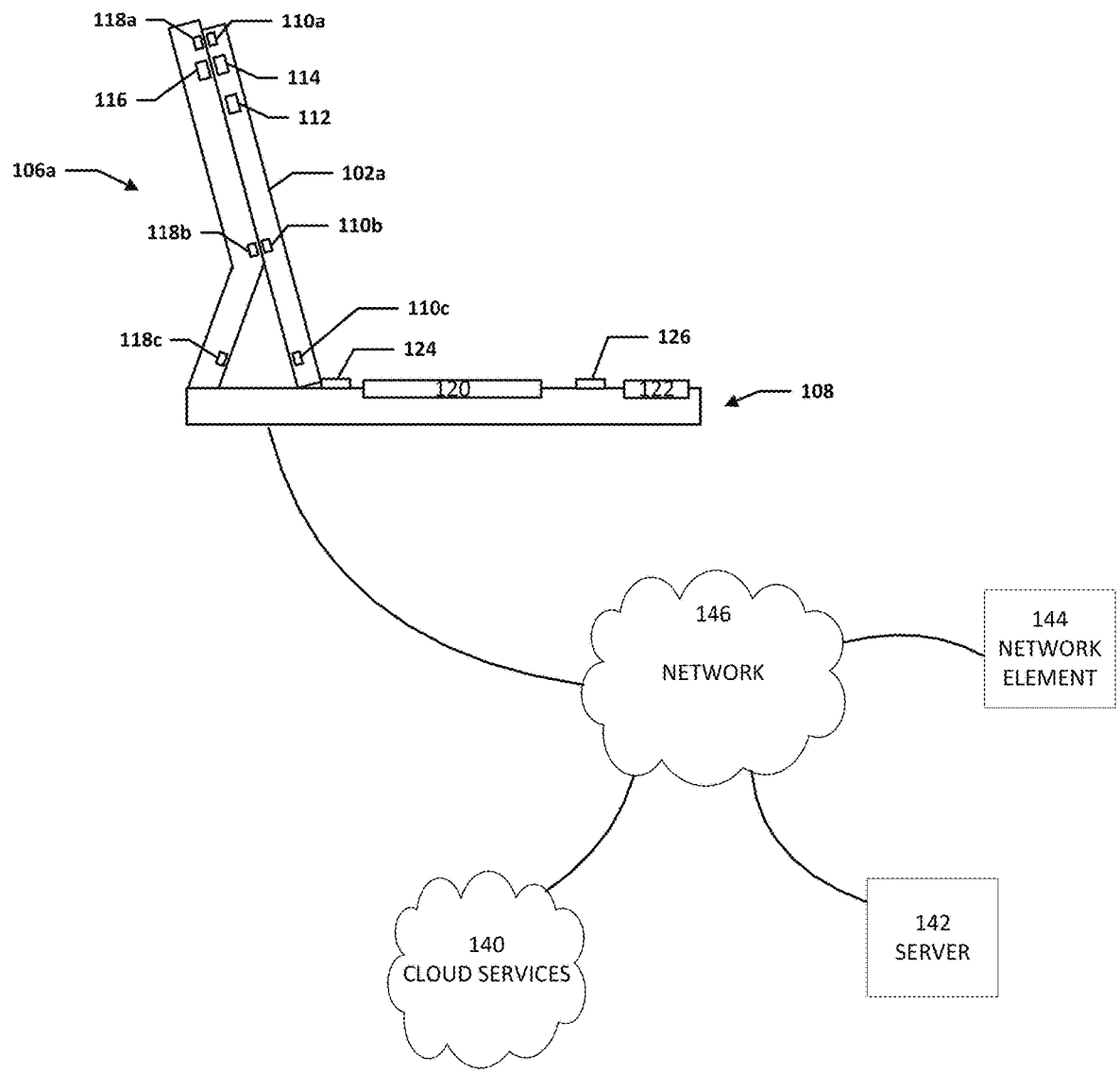
FIG. 9 is a simplified block diagram of a tablet and accessory with configuration detection, in accordance with an embodiment of the present disclosure.

Turning to FIG. 9, FIG. 9 is a simplified block diagram of the tablet 102*a* coupled to the accessory 104*a* in a clamshell mode configuration. The tablet 102*a* can include the mode sensors 110*a*-110*c*, the configuration engine 112, and the accessory communication interface 114. The accessory 104*a* can include the first portion 106*a* and the second portion 108. The first portion 106*a* of the accessory 104*a* can include the mode sensor triggers 118*a*-118*c* and the tablet communication interface 116. The second portion 108 can include the first user input portion 120, the second user input portion 122, the first tablet stop 124, and the second tablet stop 126. The tablet 102*a* (and tablet tablets 102, 102*b*, and 102*c*) may be in communication with other electronic devices (not shown), cloud services 140, server 142, and/or one or more network elements 144 using network 146. In some examples, the tablet 102*a* (and tablets 102, 102*b*, and 102*c*) may be standalone devices and not connected to the network 146 or another device.

Elements of FIG. 9 may be coupled to one another through one or more interfaces employing any suitable connections (wired or wireless), which provide viable pathways for network (e.g., the network 146, etc.) communications. Additionally, any one or more of these elements of FIG. 9 may be combined or removed from the architecture based on particular configuration needs. The tablets 102 and 102*a*-102*c* may include a configuration capable of transmission control protocol/Internet protocol (TCP/IP) communications for the transmission or reception of packets in a network. The tablets 102 and 102*a*-102*c* may also operate in conjunction with a user datagram protocol/IP (UDP/IP) or any other suitable protocol where appropriate and based on particular needs.

Turning to the infrastructure of FIG. 9, generally, the system may be implemented in any type or topology of networks. The network 146 represents a series of points or nodes of interconnected communication paths for receiving and transmitting packets of information that propagate through the system. The network 146 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In the system, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided in the system. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. The data may help determine a status of a network element or network. Additionally, messages, requests, responses, and queries are forms of network traffic, and therefore, may comprise packets, frames, signals, data, etc.

It is also important to note that the operations herein illustrate only some of the possible configurations and arrangements that may be executed by, or within, the tablets 102 and 102*a*-102*c*. Some of these configurations and arrangements may be modified or changed considerably without departing from the scope of the present disclosure. Substantial flexibility is provided by the tablets 102 and 102*a*-102*c* in that any suitable configurations and arrangements may be provided without departing from the teachings of the present disclosure.

Although the present disclosure has been described in detail with reference to particular configurations and arrangements, these example configurations and arrangements may be changed significantly without departing from the scope of the present disclosure. Moreover, certain components may be combined, separated, eliminated, or added based on particular needs and implementations. Additionally, although the tablets 102 and 102*a*-102*c*, have been illustrated with reference to particular elements and operations that facilitate the configurations and arrangements, these elements and operations may be replaced by any suitable architecture, protocols, and/or processes that achieve the intended functionality of the tablets 102 and 102a-102c.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

In Example S1, a tablet and accessory system can include a tablet and an accessory. The accessory includes a first user input and a second user input. the tablet includes a plurality of mode sensors. When the tablet is coupled to the accessory if a first mode sensor from the plurality of mode sensors is not triggered and a second mode sensor from the plurality of modes sensors is triggered, the first user input and the second user input are activated, if the first mode sensor from the plurality of mode sensors and the second mode sensor from the plurality of modes sensors are not triggered, the first user input is not activated and the second user input is activated, and if the first mode sensor and the second mode sensor are triggered, the first user input and the second user input are not activated In Example S2, the subject matter of Example S1 can optionally include where the accessory includes a plurality of mode sensor triggers and each of the plurality of mode sensor triggers can activate a specific mode sensor from the plurality of mode sensors.

In Example S3, the subject matter of Example S1 can optionally include where the plurality mode sensors are proximity sensors.

In Example S4, the subject matter of Example S1 can optionally include a where the plurality mode sensors are capacitance-based proximity sensors.

In Example S5, the subject matter of Example S1 can optionally include where the plurality mode sensors are SAR sensors.

In Example S6, the subject matter of Example S5 can optionally include where the SAR sensors are used to determine when to reduce radiation from one or more antenna located in the tablet when the tablet is not coupled to the accessory.

In Example S7, the subject matter of Example S1 can optionally include where the accessory includes a foldable portion and a plurality of mode sensor triggers are located in the foldable portion.

In Example S8, the subject matter of Example S7 can optionally include where the accessory includes a base portion and the first user input and the second user input are located in the base portion.

In Example S9, the subject matter of Example S1 can optionally include where the first user input is a keyboard and the second user input is a touchpad.

In Example S10, the subject matter of any of Examples S1-52 can optionally include where the plurality mode sensors are proximity sensors.

In Example S11, the subject matter of any of Examples S1-S3 can optionally include where the plurality mode sensors are capacitance-based proximity sensors.

In Example S12, the subject matter of any of Examples A1-A4 can optionally include where the plurality mode sensors are SAR sensors.

In Example S13, the subject matter of any of Examples S1-S5 can optionally include where the SAR sensors are used to determine when to reduce radiation from one or more antenna located in the tablet when the tablet is not coupled to the accessory.

In Example S14, the subject matter of any of Examples S1-S6 can optionally include where the accessory includes a foldable portion and a plurality of mode sensor triggers are located in the foldable portion.

In Example S15, the subject matter of any of Examples S1-S7 can optionally include where the accessory includes a base portion and the first user input and the second user input are located in the base portion.

In Example S16, the subject matter of any of Examples S1-S8 can optionally include where the first user input is a keyboard and the second user input is a touchpad.

Example M1 is a method including determining if a plurality of mode sensors on a tablet coupled to an accessory are triggered, where the accessory includes a first user input and a second user input, activating the first user input and the second user input if a first mode sensor from the plurality of mode sensors is not triggered and a second mode sensor from the plurality of modes sensors is triggered, activating the second user input but not the first user input if the first mode sensor from the plurality of mode sensors and the second mode sensor from the plurality of modes sensors are not triggered, and not activating the first user input and the second user input if the first mode sensor from the plurality of mode sensors and the second mode sensor from the plurality of modes sensors are triggered.

In Example M2, the subject matter of Example M1 can optionally include where the mode sensors are proximity sensors.

In Example M3, the subject matter of Example M1 can optionally include where the mode sensors are capacitance-based proximity sensors.

In Example M4, the subject matter of Example M1 can optionally include where the mode sensors are SAR sensors.

In Example M5, the subject matter of Example M4 can optionally include where the SAR sensors are used to determine when to reduce radiation from one or more antenna when the tablet is not coupled to the accessory.

In Example, M6, the subject matter of Example M1 can optionally include where the first user input is a keyboard and the second user input is a touchpad.

In Example M7, the subject matter of any of the Examples M1-M2 can optionally include where the mode sensors are capacitance-based proximity sensors.

In Example M8, the subject matter of any of the Examples M1-M3 can optionally include where the mode sensors are SAR sensors.

In Example M9, the subject matter of any of the Examples M1-M4 can optionally include where the SAR sensors are used to determine when to reduce radiation from one or more antenna when the tablet is not coupled to the accessory.

In Example, M10, the subject matter of any of the Examples M1-M5 can optionally include where the first user input is a keyboard and the second user input is a touchpad.

Example A1 is a device including a display, an antenna, a plurality of capacitance-based proximity sensors, and a configuration engine, where the configuration engine uses the capacitance-based proximity sensors to determine a configuration of the tablet computer when the tablet computer is attached to an accessory.

In Example A2, the subject matter of Example A1 can optionally include where the plurality of capacitance-based proximity sensors are SAR sensors.

In Example A3, the subject matter of Example A2 can optionally include where the SAR sensors are used to determine when to reduce radiation from one or more antenna when the tablet computer is not coupled to the accessory.

In Example A4, the subject matter of Example A3 can optionally include where if a first SAR sensor is not triggered and a second SAR sensor is triggered, a first user input located on the accessory and a second user input located on the accessory are activated, if the first SAR sensor and the second SAR sensor are not triggered, the first user input is not activated and the second user input is activated, and if all the SAR sensors are triggered, the first user input and the second user input are not activated.

In Example A5, the subject matter of Example A4 can optionally include where the first user input is a keyboard and the second user input is a touchpad.

In Example A6, the subject matter of any of Examples A1-A2 can optionally include where the SAR sensors are used to determine when to reduce radiation from one or more antenna when the tablet computer is not coupled to the accessory.

In Example A7, the subject matter of any of Examples A1-A3 can optionally include where if a first SAR sensor is not triggered and a second SAR sensor is triggered, a first user input located on the accessory and a second user input located on the accessory are activated, if the first SAR sensor and the second SAR sensor are not triggered, the first user input is not activated and the second user input is activated, and if all the SAR sensors are triggered, the first user input and the second user input are not activated.

In Example A8, the subject matter of any of Examples A1-A4 can optionally include where the first user input is a keyboard and the second user input is a touchpad.

Example PD1 is a portable electronic device including a plurality of mode sensors and a configuration engine to determine an configuration of the portable electronic device based on mode sensor data from each of the plurality of mode sensors when the portable electronic device is coupled to an accessory.

In Example PD2, the subject matter of Example PD1 can optionally include where the plurality of mode sensors are capacitance-based proximity sensors and the configuration engine determines the configuration of the portable electronic device based on a number of capacitance based proximity sensors in the portable electronic device being triggered by capacitance triggers in the accessory.

In Example PD3, the subject matter of any of Examples PD1-PD2 can optionally include where triggering of a specific capacitance based proximity sensor by a specific capacitance triggers indicates that the specific capacitance trigger is in close proximity to specific capacitance based proximity sensor.

In Example PD4, the subject matter of any of Examples PD1-PD3 can optionally include where the plurality of mode sensors are specific absorption rate (SAR) sensors.

In Example PD5, the subject matter of any of Examples PD1-PD4 can optionally include where sensor data from the SAR sensors are used to determine when to reduce radiation from one or more antenna located in the portable electronic device when the portable electronic device is not coupled to the accessory.

In Example PD6, the subject matter of any of Examples PD1-PD5 can optionally include where the configuration engine provides instructions to disable one or more user input devices located on the accessory based on the determined configuration of the portable electronic device.

In Example PD7, the subject matter of any of Examples PD1-PD6 can optionally include where the accessory includes a keyboard and a touchpad and the configuration engine communicates with the accessory to cause the keyboard in the accessory to be disabled based on the determined configuration of the portable electronic device.

In Example PDB, the subject matter of any of Examples PD1-PD7 can optionally include where the plurality of mode sensors are specific absorption rate (SAR) sensors and if a first SAR sensor is not triggered and a second SAR sensor is triggered, a first user input device located on the accessory and a second user input device located on the accessory are active, if the first SAR sensor and the second SAR sensor are not triggered, the first user input device is not active and the second user input device is active, and if all the SAR sensors are triggered, the first user input device and the second user input device are not active.

Example AA1 is an accessory for use with a portable electronic device, the accessory including a base segment including a first portion having a first user input device and a second portion having a second user input device and an attachment segment pivotably coupled to the base segment, the attachment segment having one or more bends and a plurality of capacitance triggers that can change a capacitance of a capacitance based proximity sensor, where the accessory is operable in one of a plurality of configurations dependent on the capacitance triggers interacting with one or more capacitance based proximity sensors in the portable electronic device.

In Example AA2, the subject matter of Example AA1 can optionally include where the first user input device is a keyboard and the second user input device is a touchpad.

In Example AA3, the subject matter of any of Examples AA1-AA2 can optionally include where if a first capacitance based proximity sensor in the portable electronic device is not triggered by a first capacitance trigger and a second capacitance based proximity sensor is triggered by a second capacitance trigger, the accessory is operable in a laptop configuration where the first user input device and the second user input device are both active.

In Example AA4, the subject matter of any of Examples AA1-AA3 can optionally include where triggering of the second capacitance based proximity sensor by the second capacitance trigger indicates that the second capacitance trigger is in close proximity to the second capacitance based proximity sensor and the first capacitance based proximity sensor not being triggered by the first capacitance trigger indicates that first capacitance trigger is not close proximity to the first capacitance based proximity sensor.

Example SS1 is a system including a portable electronic device and an accessory. The portable electronic device including a plurality of mode sensors. The accessory including a base segment including a first portion having a first user input device and a second portion having a second user input device and an attachment segment pivotably coupled to the base segment, the attachment segment having one or more bends and a plurality of mode sensor triggers, where the accessory is operable in one of a plurality of configurations dependent on the mode sensor triggers interacting with one or more of the mode sensors in the portable electronic device.

In Example SS2, the subject matter of Example SS1 can optionally include where the portable electronic device includes a configuration engine that uses mode sensor data from the mode sensors to determine a configuration of the portable electronic device when the portable electronic device is attached to the accessory.

In Example SS3, the subject matter of any of Examples SS1-SS2 can optionally include where a configuration engine provides instructions to disable one or more user input devices located on the accessory based on a determined configuration of the portable electronic device.

In Example SS4, the subject matter of any of Examples SS1-SS3 can optionally include where the first user input device is a keyboard and the second user input device is a touchpad and a configuration engine communicates with the accessory to cause the keyboard to be inactive based on a determined configuration of the portable electronic device.

In Example SS5, the subject matter of any of Examples SS1-SS4 can optionally include where the plurality of mode sensors are capacitance-based proximity sensors.

In Example SS6, the subject matter of any of Examples SS1-SS5 can optionally include where the plurality of mode sensors are specific absorption rate (SAR) sensors.

In Example SS7, the subject matter of any of Examples SS1-SS6 can optionally include where sensor data from the SAR sensors are used to determine when to reduce radiation from one or more antenna when the portable electronic device is not coupled to the accessory.

In Example SS8, the subject matter of any of Examples SS1-SS7 can optionally include where if a first SAR sensor is not triggered and a second SAR sensor is triggered, the first user input device and the second user input device are active, if the first SAR sensor and the second SAR sensor are not triggered, the first user input device is not active and the second user input device is active, and if all the SAR sensors are triggered, the first user input device and the second user input device are not active.

What is claimed is:

1. A portable electronic device comprising:
   a plurality of mode sensors; and
   a configuration engine to determine a configuration of the portable electronic device based on mode sensor data from each of the plurality of mode sensors when the portable electronic device is coupled to an accessory,
   wherein the plurality of mode sensors are specific absorption rate (SAR) sensors and when a first SAR sensor is not triggered and a second SAR sensor is triggered, a first user input device located on the accessory and a second user input device located on the accessory are active, when the first SAR sensor and the second SAR sensor are not triggered, the first user input device is not active and the second user input device is active, and when all the SAR sensors are triggered, the first user input device and the second user input device are not active.

2. The portable electronic device of claim 1, wherein the plurality of mode sensors are capacitance-based proximity sensors and the configuration engine determines the configuration of the portable electronic device based on a number of capacitance based proximity sensors in the portable electronic device being triggered by capacitance triggers in the accessory.

3. The portable electronic device of claim 2, wherein triggering of a specific capacitance based proximity sensor by a specific capacitance triggers indicates that the specific capacitance trigger is in close proximity to specific capacitance based proximity sensor.

4. The portable electronic device of claim 1, wherein the plurality of mode sensors are specific absorption rate (SAR) sensors.

5. The portable electronic device of claim 4, wherein sensor data from the SAR sensors are used to determine when to reduce radiation from one or more antenna located in the portable electronic device when the portable electronic device is not coupled to the accessory.

6. The portable electronic device of claim 1, wherein the configuration engine provides instructions to disable one or more user input devices located on the accessory based on the determined configuration of the portable electronic device.

7. The portable electronic device of claim 6, wherein the accessory includes a keyboard and a touchpad and the configuration engine communicates with the accessory to cause the keyboard in the accessory to be disabled based on the determined configuration of the portable electronic device.

8. An accessory for use with a portable electronic device, the accessory comprising:
   a base segment including a first portion having a first user input device and a second portion having a second user input device; and
   an attachment segment pivotably coupled to the base segment, the attachment segment having one or more bends and a plurality of capacitance triggers that can change a capacitance of a capacitance based proximity sensor, wherein the accessory is operable in one of a plurality of configurations dependent on the capacitance triggers interacting with one or more capacitance based proximity sensors in the portable electronic device,
   wherein when a first capacitance based proximity sensor in the portable electronic device is not triggered by a first capacitance trigger and a second capacitance based proximity sensor is triggered by a second capacitance trigger, the accessory is operable in a laptop configuration where the first user input device and the second user input device are both active, wherein when the first capacitance based proximity sensor is not triggered by the first capacitance trigger and the second capacitance based proximity sensor is not triggered by the second capacitance trigger, the accessory is operable in a laptop configuration where the first user input device is not active and the second user input device is active, and wherein when the first capacitance based proximity sensor is triggered by the first capacitance trigger and the second capacitance based proximity sensor is triggered by the second capacitance trigger, the first user input device and the second user input device are not active.

9. The accessory of claim 8, wherein the first user input device is a keyboard and the second user input device is a touchpad.

10. The accessory of claim 8, wherein triggering of the second capacitance based proximity sensor by the second capacitance trigger indicates that the second capacitance trigger is in close proximity to the second capacitance based proximity sensor and the first capacitance based proximity sensor not being triggered by the first capacitance trigger indicates that first capacitance trigger is not close proximity to the first capacitance based proximity sensor.

11. A system comprising:
a portable electronic device that includes:
a plurality of mode sensors; and
an accessory, wherein the accessory includes:
- a base segment including a first portion having a first user input device and a second portion having a second user input device; and
- an attachment segment pivotably coupled to the base segment, the attachment segment having one or more bends and a plurality of mode sensor triggers, wherein the accessory is operable in one of a plurality of configurations dependent on the mode sensor triggers interacting with one or more of the mode sensors in the portable electronic device, wherein the plurality of mode sensors are specific absorption rate (SAR) sensors and when a first SAR sensor is not triggered and a second SAR sensor is triggered, the first user input device and the second user input device are active, when the first SAR sensor and the second SAR sensor are not triggered, the first user input device is not active and the second user input device is active, and when all the SAR sensors are triggered, the first user input device and the second user input device are not active.

12. The system of claim 11, wherein the portable electronic device includes a configuration engine that uses mode sensor data from the mode sensors to determine a configuration of the portable electronic device when the portable electronic device is attached to the accessory.

13. The system of claim 11, wherein a configuration engine provides instructions to disable one or more user input devices located on the accessory based on a determined configuration of the portable electronic device.

14. The system of claim 11, wherein the first user input device is a keyboard and the second user input device is a touchpad and a configuration engine communicates with the accessory to cause the keyboard to be inactive based on a determined configuration of the portable electronic device.

15. The system of claim 11, wherein the plurality of mode sensors are capacitance-based proximity sensors.

16. The system of claim 11, wherein sensor data from the SAR sensors are used to determine when to reduce radiation from one or more antenna when the portable electronic device is not coupled to the accessory.

* * * * *